US007263521B2

(12) United States Patent  
Carpentier et al.

(10) Patent No.: US 7,263,521 B2
(45) Date of Patent: Aug. 28, 2007

(54) NAVIGATION OF THE CONTENT SPACE OF A DOCUMENT SET

(75) Inventors: Paul R. M. Carpentier, Boechout (BE); Maarten J. P. A. Willems, Leuven (BE); Joris Winters, Bierbeek (BE)

(73) Assignee: Caringo, Inc., Austin, TX (US)

( * ) Notice: Subject to any disclaimer, the term of this patent is extended or adjusted under 35 U.S.C. 154(b) by 513 days.

(21) Appl. No.: 10/730,694

(22) Filed: Dec. 8, 2003

(65) Prior Publication Data

US 2004/0177058 A1 Sep. 9, 2004

Related U.S. Application Data

(60) Provisional application No. 60/432,495, filed on Dec. 10, 2002.

(51) Int. Cl.
*G06F 7/00* (2006.01)
(52) U.S. Cl. .......................................................... 707/4
(58) Field of Classification Search .................. 707/10, 707/5
See application file for complete search history.

(56) References Cited

U.S. PATENT DOCUMENTS

| | | |
|---|---|---|
| 5,255,270 A | 10/1993 | Yanai |
| 5,446,653 A | 8/1995 | Miller |
| 5,454,100 A | 9/1995 | Sagame |
| 5,690,452 A | 11/1997 | Baublits |
| 5,781,629 A | 7/1998 | Haber |
| 5,978,791 A | 11/1999 | Farber |

(Continued)

FOREIGN PATENT DOCUMENTS

EP    1 087 309 A2    3/2001

(Continued)

OTHER PUBLICATIONS

Applicant: Hypertrust NV; PCT; International Search Report; Int'l Filing Date Sep. 12, 2003; Int'l Apl. No.: PCT/IB 03 / 05749.

*Primary Examiner*—Don Wong
*Assistant Examiner*—Angela M Lie
(74) *Attorney, Agent, or Firm*—Beyer Weaver LLP

(57) ABSTRACT

Content-based addressing is used to navigate forward, backward and in a circular fashion through documents in a content space. To enable backward navigation, a descriptor file is created for a new version that contains not only a message digest for the new version, but also a message digest of the older document. A message digest is created for the descriptor file. A user navigates backward starting with the message digest of the descriptor file. To enable forward navigation, a mapping table maps a message digest of an older document into the message digest of the new version. A high-level descriptor file contains the message digest of the original document and the message digest of the mapping table. The message digest of the high-level descriptor file is returned to the user. A user navigates forward starting with the high-level descriptor file message digest. To enable circular navigation, a mapping table maps a message digest of a second document into a message digest of a version of the second document containing a message digest of a first document. The techniques are combined to allow navigation through a complex content space.

7 Claims, 21 Drawing Sheets

Forward Navigation

U.S. PATENT DOCUMENTS

| | | |
|---|---|---|
| 6,151,659 A | 11/2000 | Solomon |
| 6,415,280 B1 | 7/2002 | Farber |
| 6,480,931 B1 | 11/2002 | Buti |
| 6,523,130 B1 | 2/2003 | Hickman |
| 6,658,589 B1 | 12/2003 | Taylor |
| 6,715,048 B1 | 3/2004 | Kamvysselis |
| 6,757,790 B2 | 6/2004 | Chalmer |
| 6,763,446 B1 | 7/2004 | Kemeny |
| 6,810,446 B1 * | 10/2004 | Brelin et al. ............. 710/36 |
| 6,826,711 B2 | 11/2004 | Moulton |
| 6,877,072 B1 | 4/2005 | Dias |
| 6,912,548 B1 | 6/2005 | Black |
| 6,928,442 B2 | 8/2005 | Farber |
| 6,978,282 B1 | 12/2005 | Dings |
| 7,047,359 B1 | 5/2006 | Van Krevelen |
| 7,058,772 B2 | 6/2006 | Kuwabara |
| 7,062,648 B2 | 6/2006 | Moulton |
| 7,065,610 B1 | 6/2006 | Black |
| 7,082,441 B1 | 7/2006 | Zahavi |
| 7,100,008 B2 | 8/2006 | Yagawa |
| 7,113,945 B1 | 9/2006 | Moresket |
| 7,114,027 B2 | 9/2006 | Gilfix |
| 7,124,305 B2 | 10/2006 | Margolus |
| 7,155,466 B2 | 12/2006 | Rodriquez |
| 7,162,571 B2 | 1/2007 | Kilian |
| 2003/0050927 A1 * | 3/2003 | Hussam .................... 707/5 |
| 2004/0107214 A1 * | 6/2004 | Hung et al. ........... 707/104.1 |
| 2004/0220975 A1 * | 11/2004 | Carpentier et al. ....... 707/200 |
| 2006/0080308 A1 * | 4/2006 | Carpentier et al. ......... 707/3 |

FOREIGN PATENT DOCUMENTS

| | | |
|---|---|---|
| EP | 1049988 | 4/2002 |
| WO | WO99/38092 | 7/1999 |
| WO | WO01/18633 | 3/2001 |
| WO | WO 02/01351 A2 | 1/2002 |

* cited by examiner

FIG. 1A time t1
FIG. 1B time t2
FIG. 1C time t3
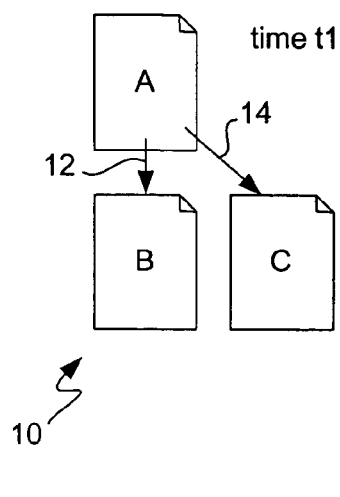
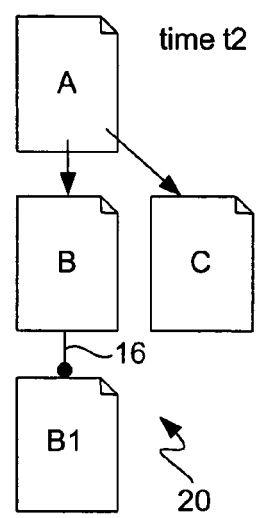
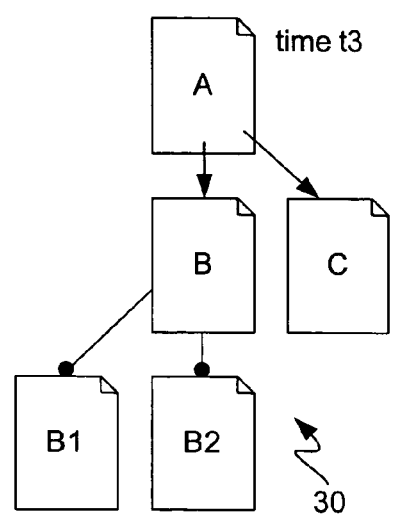
FIG. 1D time t4
FIG. 1E time t5
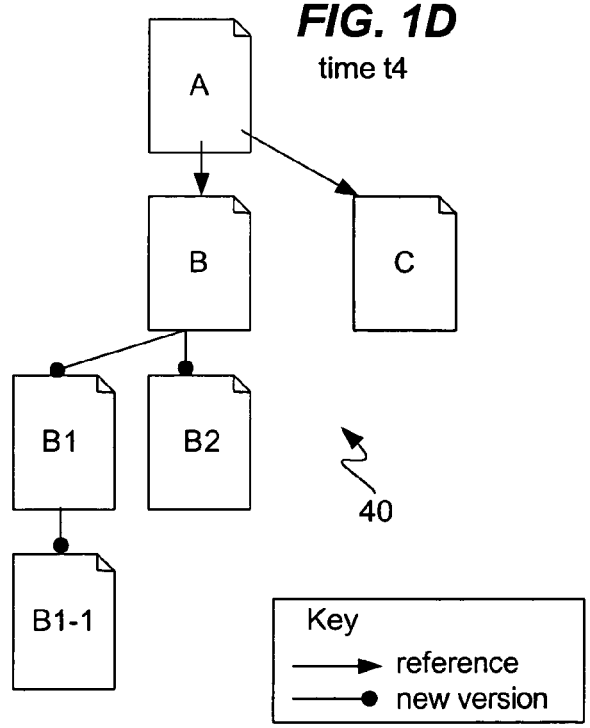
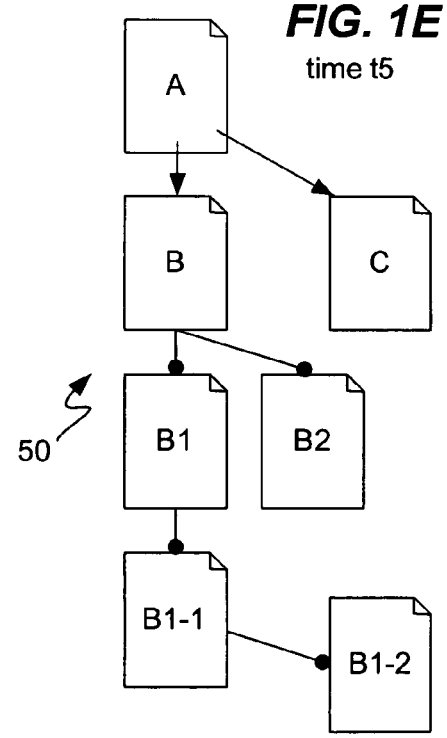
Key
→ reference
—● new version Set Up Backward Navigation Backward Navigation to Original Document Backward Navigation Variation Backward Navigation Example - Descriptor File Backward Navigation Example - Index File Backward Navigation Example - Receipt File Forward Navigation over Versions Forward Navigation Set up Forward Navigation Forward Navigation Forward Navigation Circular Reference Circular Navigation Set up Circular Navigation Circular Navigation

NAVIGATION OF THE CONTENT SPACE OF A DOCUMENT SET

This application claims priority of U.S. provisional patent application No. 60/432,495, filed Dec. 10, 2002 entitled "Content-based Addressing and Navigation Over Time," which is hereby incorporated by reference.

FIELD OF THE INVENTION

The present invention relates generally to the storage and retrieval of information using a computer. More specifically, the present invention relates to techniques for the content-based addressing of documents and their versions, and navigation between versions of documents.

BACKGROUND OF THE INVENTION

The prior art includes the concept of content-addressable information, its storage and retrieval, and the use of hash functions, message digests and descriptor files, as described in international publication No. WO 99/38093. International publication No. WO 99/38092 describes a particular technique for the storage and access of content-addressable information, and international publication No. WO 01/18633 describes a technique for encrypting content-addressable information. These publications are all incorporated by reference.

As discussed in the prior art, it is apparent that content-addressable techniques can be very useful for storing and accessing documents in a fashion that guarantees the integrity of the stored content. Where a document or information can evolve over time or where documents need to reference one another, though, a host of new issues are presented. Because a content-based address uniquely identifies particular content, evolving content means a new content address for the document. As discussed in the prior art, one technique is to use a message digest (such as an "MD5") to uniquely represent a particular document. In a situation where there is a complex content space, though, there may be many documents or sets of documents needed to represent a particular type of information (such as a set of user manuals for a complex computer system, or the technical documentation for an aircraft). In these situations, a single MD5 might uniquely represent many documents (for example, using a descriptor file), and an individual document might contain many different MD5s each referencing a single document or a set of documents. Further, there may be many different versions of a set of documents that are changing over time (where some documents in the set might change and others might not), and two different documents might each need to reference one another. With such a complex content space, the management of, and access to, the information in a way that insures the integrity of the information becomes more difficult.

For example, consider the complete technical documentation for a Boeing 747 aircraft. There will be sets of documents each describing a particular subsystem of the aircraft such as the fuel subsystem, the communication subsystem, the airframe subsystem, etc. These documents will necessarily need to reference one another and they will invariably change over time. To further complicate matters, there is no single set of documentation that completely describes all 747's in use. While there may be a master set of documentation that describes generically a 747 aircraft, each individual aircraft that rolls off the assembly line with a unique serial number will have its own specific set of documentation due to the fact that it has different options and might be destined for a different airline. Thus, different versions of the original documentation exist not only because the documentation set changes over time for a particular aircraft, but also because different aircraft having different options will need different versions of the original documentation. All of this technical documentation for a 747 aircraft will then evolve over time as parts change, as procedures change, and as the hundreds of FAA directives are received and complied with.

To illustrate the nature of the problem, it is believed that once an aircraft has been manufactured and is ready for flight, it can take weeks even months to assemble all the technical documentation and to insure that the documentation has been updated and all replacement pages have been inserted in the correct locations before the aircraft will be certified for flight. Even when all the technical documentation has been updated and the latest version is available for use, it can be extremely useful in the future to be able to go back and review the version of the documentation that existed at a particular point in time. In the real world, many other examples exist where a complex set of documentation having internal references and versions needs to be stored efficiently, managed and accessed intelligently in a way that insures the integrity of the information being retrieved. As such, mechanisms and techniques are needed to manage such complex content reliably without relying on an end user or complex software applications to do so. It would be particularly desirable to make use of the prior art content-addressable storage techniques to address such a problem.

SUMMARY OF THE INVENTION

To achieve the foregoing, and in accordance with the purpose of the present invention, a technique is described that allows for the content-based addressing and navigation of content as it evolves through time, and for the navigation between documents that reference one another. The concept of a "content space" that represents a particular set of documents at a particular point in time is introduced. The present invention describes techniques for navigating both forward and backward through the documents in such a content space. In addition, a technique is described for navigating in circular fashion between documents that reference each other.

To enable backward navigation, system software creates a variation of a descriptor file when a new version of a document is created. (The new version may also be received by a user, or a message digest of the new version may be received.) The user indicates in some fashion that the new document shall be considered a later version of an older document. A descriptor file is created for the new version that contains not only a message digest for the new version, but also a message digest of the older document. A message digest is then created for the descriptor file. A user may then navigate backward starting with the message digest of the descriptor file. Any number of new versions may be chained together in this fashion. System software may allow the user to backward navigate and view each preceding version, or the user may jump directly to the earliest version. Time stamping and digital signatures can be combined with backward navigation to provide proof of authenticity.

To enable forward navigation, system software creates a mapping table (or numerous mapping tables if needed) when a version of a document is created. (The new version may also be received by a user, or a message digest of the new version may be received.) The user indicates in some fashion that the new document shall be considered a later version of an original document. Descriptor files are created for the original document and the new version, and message digests are created for each descriptor file. A mapping table maps the message digest of the older document into the message digest of the new version. (Alternatively, the mapping table maps the message digests of the documents themselves, rather than the digests of their respective descriptor files.) A high-level descriptor file is created that contains the message digest of the original document and a message digest of the mapping table. The message digest of the high-level descriptor file is returned to the user.

A user may then navigate forward starting with the message digest of the high-level descriptor file. Any number of new versions may be chained together in this fashion. System software may allow the user to forward navigate and view each version, or the user may jump directly to the newest version. In an alternate embodiment, the message digest of the original document is returned along with the mapping table (or a message digest of the mapping table) and the user is informed that forward navigation in the desired content space can be performed if a session is invoked using these parameters. In this alternate embodiment, a high-level descriptor file is not used. The mapping tables created may also be used by the system to allow backward navigation.

To enable circular navigation, system software creates a mapping table when referencing between documents is needed. One document contains the message digest of a second document. A new version of the second document is created that contains the message digest of the first document, and a mapping table maps the message digest of the original second document into the message digest of the new version of the second document. The message digest of the first document and the mapping table are returned to the user for later use in a session, or, a new descriptor file is created that contains the message digest of the original document and a message digest of the mapping table. The message digest of the high-level descriptor file is returned to the user. Any number of documents may be linked in a circular fashion using this technique The above techniques may be combined to allow navigation through a complex content space.

BRIEF DESCRIPTION OF THE DRAWINGS

The invention, together with further advantages thereof, may best be understood by reference to the following description taken in conjunction with the accompanying drawings in which:

FIGS. 1A-1E illustrate a simple set of documents that evolve over time.

DETAILED DESCRIPTION OF THE INVENTION

Figure 2:
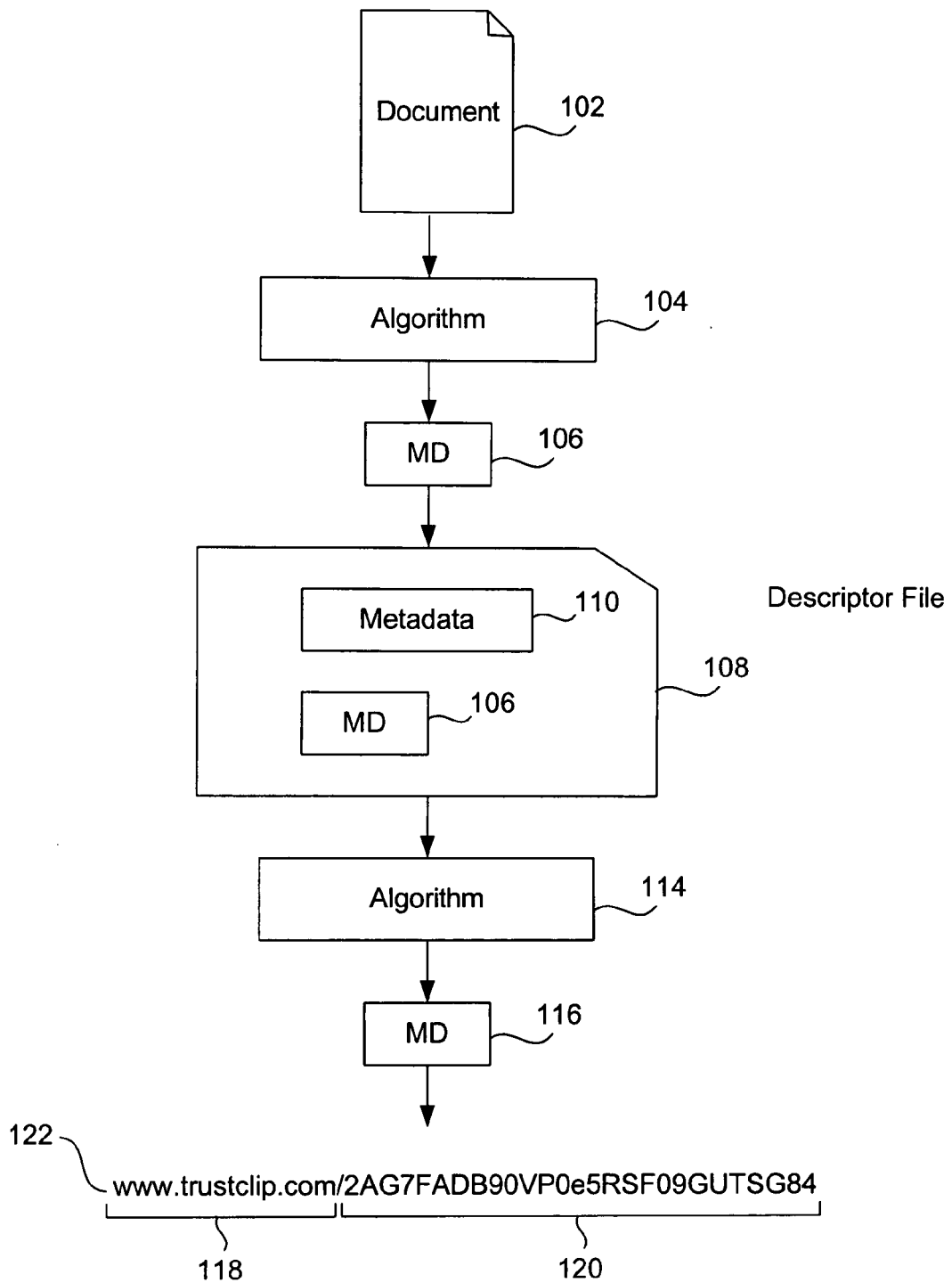
FIG. 2 illustrates a technique of creating a hash-based unique intrinsic identifier for a document.

FIGS. 1A-1E illustrate a simple set of documents that evolve over time. We will refer to the content space for a set of documents as those documents existing at a particular point in time. Of course, the present invention is applicable to a content space that is much more complex. The content spaces shown will be useful for an understanding of the invention and will be briefly described before going into more detail.

FIG. 1A shows content space 10 at time t1 that includes documents A, B and C. In this example, document A includes within its text references 12 and 14 to documents B and C. While these references may simply be a textual file name, in an embodiment most suitable for application of the present invention, references 12 and 14 are each a hash value that uniquely identifies documents B and C by virtue of their content. Preferably, references 12 and 14 are hash values that each uniquely identify a descriptor file, the descriptor file containing a hash value that uniquely identifies the document. In this example, a user has created documents A, B and C and it is desired that document A contains explicit references within itself to document B and C.

FIG. 1B shows content space 20 at time t2 in which the content space has evolved over time. In this situation, the user has created a new version B1 of document B as indicated symbolically by 16. Thus, if a user wishes to view the latest version of this document set, the user would wish to view documents A, C and B1.

FIG. 1C shows content space 30 at time t3 in which the document set has further evolved. In this example, the user has created another version of document B, namely document B2. In this example, document B2 is not necessarily a newer version of document B1 in a linear progression. Documents B1 and B2 can be viewed as different versions of document B that are intended for different purposes. For example, if we assume that document B is a portion of a business plan, document B1 might correspond to that version of the plan to be released to the marketing department, while document B2 might be that version of the plan to be released to the engineering department.

FIG. 1D shows content space 40 at time t4 in which the content space has further evolved. In this situation the user has created a new version of document B1, namely, document B1-1.

FIG. 1E shows content space 50 at time t5 in which the content space has further evolved over time. In this situation, the user has created yet another version of document B, namely B1-2, derived from B1-1. In this situation, should a user wish to view the latest version of the document set intended for the marketing department, the end user would wish to view documents A, C and B1-2. On the other hand, should a user wish to view the latest version of the documents intended for the engineering department, the user would wish to view documents A, C and B2.

Thus, it can be seen that a "version" of a document can be viewed in at least two different ways. In one sense, a new version of a document is the next version of that document that likely includes improvements and is intended to replace the original. For example, document B1-1 is a version of document B1 that is likely meant to replace B1. On the other hand, a version may also refer to a different version of a document intended for a different purpose. For example, while documents B1 and B2 are different versions of document B, it is possible that they are not intended to replace document B, only that B1 is the marketing version of the business plan, and B2 is the engineering version of the business plan. It may very well be that neither B1 nor B2 is intended to replace document B. The intention may be that document B is useful in its own right, and documents B1 and B2, two new versions of document B, are useful for two different purposes.

In fact, a new version of a document refers to virtually any alteration of a previous document or a set of documents as defined by the user or creator of the document set. For example, with reference to FIG. 1B, while it is possible that document B1 is a slightly modified version of document B, it is also possible that document B1 is a radically different document than document B, and is considered a version simply because the user of the document set has determined that document B1 shall be considered a version of document B. In fact, there is no requirement that a new version of an older document bear any relationship to the previous document. Should a user decide that particular content be deemed to be a version of some other content, then it shall be considered a version in accordance with the present invention. There is no requirement that a version of an existing document bear any degree of similarity to the existing document.

For example, should a company wish to group all of its press releases together week by week, each succeeding week's worth of press releases may be deemed a version of the previous week's press releases, even though the information in the succeeding versions of the press releases may be quite different. Further, a version of an existing document might in fact be a document that was created before the existing document. For example, should a user be presented with a document F and a document G that was created after the creation of document F, the user may declare that G is a version of F (a traditional version), or the user may declare that document F is a version of document G within the context of the present invention.

Further, explicit references to documents and implicit references (by calling a document a version of another) may be combined in any way. For example, while document B has no explicit reference within it that references documents B1 (i.e., it is implicitly understood to the user that B1 is a version of B), it is also feasible that document B can contain an explicit reference to document B1 at the same time that B1 is considered a version of document B (as discussed in the section on circular navigation below). Alternatively, the situation may also exist as shown in which a document such as document A does contain an explicit reference to document B, but document B is not considered a version of document A.

As used herein, the term "user" refers to any user of the system herein described such as an editor, publisher, writer, document manager, or other individual or computer that is managing, storing or accessing documents. Within the embodiments of the invention herein described, such a user uses the system to navigate backward or forward over versions of documents, to navigate in a circular fashion between documents, or enables the system to perform such navigation. In addition, different users may be creating versions of a document set at the same time for their own specific use. The present invention allows each user to create their own version independently of the others, and without knowledge that others are also creating different versions.

Thus, as described above, the content space of an original document set evolves over time. It will be advantageous for a user of any document set of any complexity to be able to view the complete document set at a particular point in time, to be able to obtain the latest version of a document set for an intended purpose, and to be able to step back through time and look at the evolution of the versions of the document set. Techniques for such forward, backward and circular navigation within a content space use hash-based addressing techniques that will now be briefly reviewed.

Content-Based Addressing

FIG. 2 illustrates a technique of creating a hash-based unique identifier for a document. To understand the following discussion of forward, backward and circular navigation through a content space, it will be useful to briefly review a content-based addressing technique in the context of the present invention.

FIG. 2 illustrates a technique of producing a unique identifier 122 for document 102. The following description uses the example of simple documents being represented and managed according to the present invention; however, document 102 may be any type of information represented in digital form. For example, the present invention is applicable to any electronic representation of information such as a computer file, a group of files, a group of file identifiers, or other collections of data or database information. Such other collections of data include frames or clips from digital audio or video streams, digital photographs, scanned paper documents, voice messages, CAD/CAM designs, MRI or X-ray data, streams from message records or files, log entries from audits or status logs of systems, e-mail archives, check images, etc. Database information includes records from a relational, hierarchic, network or other database. In general, digital information may include any string of binary (or n-nary) digits. In one embodiment, the digital information is manipulated as binary large objects, or BLOBs. The following description uses simple documents as examples, although the invention is not so limited. The term "computer file" is also used herein to encompass any electronic representation of the aforementioned types of information.

An algorithm 104 is used to process document 102 to produce a unique identifier 106 for the document. Preferably, algorithm 104 is a hash function that produces a hash value 106. In this example, a hash function is used to produce the hash value or message digest ("MD") 106. Well known hash functions include: MD2, MD5, SHA, SHA-1, SHA-256, RIPEMD-160, etc.

As is known in the art, use of a hash function over a document produces a unique hash value or message digest that is a "digital fingerprint" of the document and uniquely identifies it. As used herein, the term message digest or "MD" refers to the hash value created by a hash function and is intended to encompass any type of hash function that might be used to create a unique, content-based identifier for a document. This example of FIG. 2 assumes that the MD5 algorithm is used to create MD 106.

Message digest 106 can be used as is for purposes of the present invention or it may be embedded within a descriptor file 108. Descriptor file 108 includes message digest 106 and any of a variety of meta data 110 that further describes, identifies or explains the information of document 102, or any other information. A description of descriptor files and types of meta data are described in the international applications referenced above. In one embodiment, meta data 110 includes a descriptive file name, the file size, access rights, the owner, a retention period, etc. Higher level information such as a subject, a title, an author, a date, may also be included. Descriptor files are useful for serving as a placeholder for this type of information if needed for a particular application, and also for holding the message digests for a group of files, if the situation so dictates.

The present invention is applicable to message digests that reference a descriptor file, and also to message digests that directly identify an individual document. In the below description, the context makes clear where descriptor files are preferred (or needed). In general, though, when the description recites 'a message digest of a document' this can refer to a message digest of the descriptor file of the document (the file holds the MD5 of the document), or the message digest that identifies the document directly.

Meta data 110 may include information to assist with locating a document, reconstructing its directory environment, a pre-packaged electronic commerce transaction for generating revenue for use of the enclosed content, or information that describes options for the descriptor file and its use and contents. Meta data may refer to the descriptor file itself, or may be specific to a particular document referenced by the descriptor file (by virtue of the message digest for the document being listed within the descriptor file). Meta data concerning the descriptor file includes its type, a file name, a creation date, comments, the number of data files or directory folders it represents, the size of all files it represents, authors, keywords, etc. Meta data for a particular document may include the file name, a file size, a creation date, file type, etc. To assist with embodiments of the present invention, meta data may also include a mapping table, the name of a content space such as an intended purpose, version number, release date or other, whether the content space is enabled for forward or backward navigation, or other security-related information such as digital signatures, time stamps, digital certificates, tokens for digital rights management purposes, or any other cryptographic key material set.

Once the descriptor file has been formed, a hash function 114 is applied to the descriptor file to produce another message digest 116. Message digest 116 may now be used to uniquely locate and identify document 102 using techniques shown in the prior art. For example, descriptor file 108 and document 102 may be stored in the regular file system of a computer where their file names respectively are the bit string represented by MD 116 and MD 106. Or, each file may be stored within a database where the key to the file is the respective message digest for each file. In general, file 108 and document 102 may be stored within any content-addressable storage system where they can be located and retrieved using their message digests alone.

In a preferred embodiment, MD5 message digests are converted to a form easily readable and noted by a human. Because a resultant message digest from the MD5 hash function is a 128-bit number, it is desirable to encode this number in a more manageable form for human use. The resultant number may be encoded in any of a variety of forms including decimal, hexadecimal or binary. Preferably, the number is converted to a base 32 number mapped to the set of twenty-six alphabetic and numeric characters in the base ASCII character set. This mapping is referred to as "ASCII Armoring" and is commonly used to render binary information in a limited character set for transmission over protocols that require content to be constrained to alphanumeric coding. In a preferred embodiment, a flag character is included at a predetermined position within the resulting string, bringing the total length of the string to 27 characters. This flag character can also provide information such as algorithm to use, type of file, etc.

The result is a 27-character ASCII string of digits and upper case letters. Such a format provides a compact form that may more easily be written down by a person and/or manipulated by a computer, and is also in a form that is easily accommodated by many software programs. In addition, this particular representation of a message digest has the advantage of being more easily retrieved by data query, coded into software application file requests, referenced by a content or asset management system, requested in an object browser, electronically copied and pasted from one document to another, sent via electronic mail, etc.

In this example, MD 116 has been converted into the 27-character string 120. In a particular embodiment, string 120 is concatenated with an Internet name 118 to produce a URL 122. Name 118 is resolvable by a DNS and includes a domain name "trustclip.com." In this particular embodiment, "trustclip.com" is used to locate a web server that is connected to a content-addressable storage device. A service provider operating the domain "trustclip.com" stores such documents using the message digest as a unique identifier and makes such a document available to a user when a URL (such as URL 122) is provided. In this fashion, when a user is given URL 122, or otherwise uses it as a link, the web site "trustclip.com" takes MD 120, locates the document, and returns it to the user. If MD 120 identifies a descriptor file that includes message digests for multiple documents, then all of these documents are returned. The present invention contemplates that a message digest (in form 116, 120 or other) may be used in many ways to locate an original document. As previously mentioned, the message digest may be used as the file name of the document, a key in a database, embedded within a URL or URI (or other file locator such as an IP address or path name), or may simply be used as is.

In another embodiment, the message digest is given to a service provider who then uses the message digest to search for and locate the document that is uniquely identified by the message digest. For example, the service provider may search their own content-addressable storage, or may search for the document in the storage of other entities. The message digest may also be broadcast throughout a corporate network, over an intranet, over the Internet, or in other ways with the purpose of finding the document that is uniquely identified by the message digest.

Descriptor Files

Embodiments of descriptor files are described in the above-referenced international applications. The below figures provide further variations useful in the context of the present invention.

Figure 3:
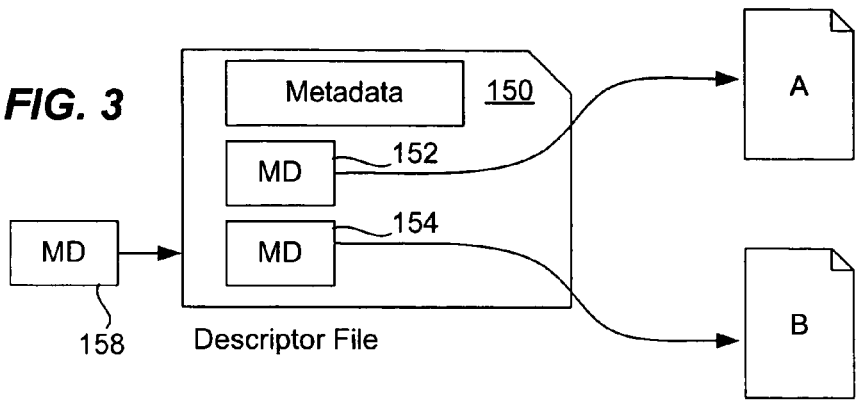
FIG. 3 illustrates an example of a first type of descriptor file and message digest.

FIG. 3 illustrates an example of a first type of descriptor file and message digest. Descriptor file 150 has optional meta data and two message digests 152 and 154 that uniquely address documents A and B. Of course, a descriptor file may contain a single message digest or contain any number of message digests that reference any number of files. In this example, two documents are shown for ease of explanation. In this type of descriptor file, only message digests that directly identify a particular document are included. Of course, a message digest 158 may also be computed for file 150, in which case MD 158 is used to reference documents A and B.

Figure 4:
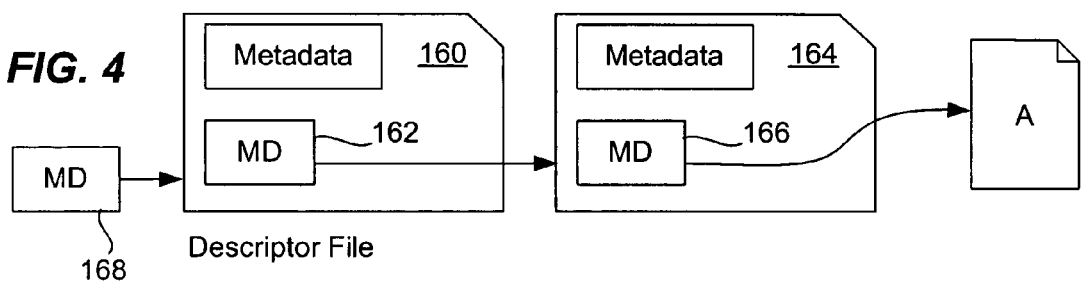
FIG. 4 illustrates an example of a second type of descriptor file.

FIG. 4 illustrates an example of a second type of descriptor file. File 160 includes optional meta data and a message digest 162 that uniquely identifies another descriptor file 164. Inside file 164 is message digest 166 that identifies document A. For this type of descriptor file 160, only message digests that reference another descriptor file are present. Only one MD 162 is shown, although there may be any number of message digests within the file, each referencing another descriptor file. Of course, a message digest 168 may be formed for descriptor file 160.

Figure 5:
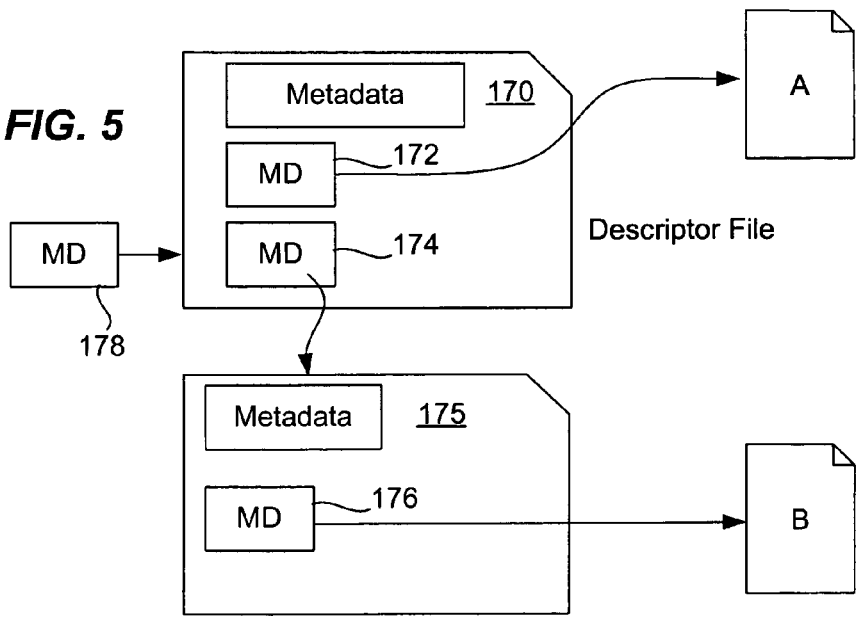
FIG. 5 illustrates a third type of descriptor file.

FIG. 5 illustrates a third type of descriptor file 170. In this example, file 170 includes optional meta data, message digest 172 that uniquely identifies document A, and message digest 174 that identifies another descriptor file 175. File 175 includes message digest 176 that identifies document B. For this type of descriptor file 170, it includes both message digests that directly identify a document, as well as message digests that identify another descriptor file. Of course, a message digest 178 may be created for descriptor file 170. These various types of descriptor files are useful in embodiments of the invention.

Backward Navigation

Figure 6:
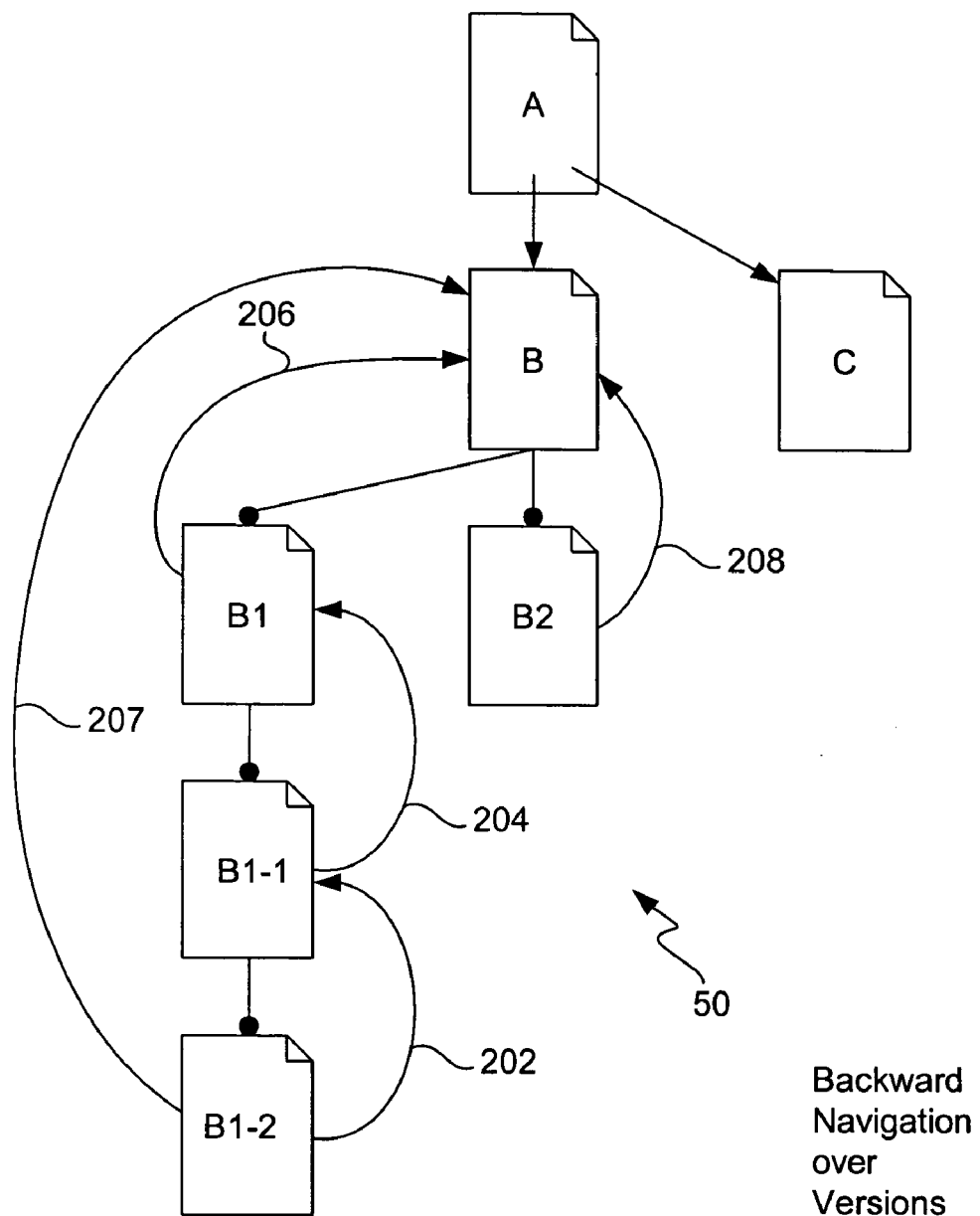
FIG. 6 illustrates a content space for a set of documents at a time in which a user wishes to navigate backward over versions.

FIG. 6 illustrates content space 50 for a set of documents at time t5 in which a user wishes to navigate backwards over versions. In this example, a user may wish to start with a most recent version of a particular document and either step back through each version in turn, or return directly to the original version of the document. For example, if the user is in possession of document B1-2, he or she may wish to follow links 202, 204 and 206 to review the previous versions of that document. Or the user may wish to jump back from B1-2 directly to document B directly via 207. Or, should the user be in possession of document B2, the user may wish to follow link 208 to view the original document B. For example, document B1 might be the marketing version of document B, while document B2 might be the engineering version of document B.

In this simple example, only single documents are shown. It will be appreciated, though, that document B (for example), may actually be a set of documents of any number. Version B1 may be considered a version of document set B because a document has been added to the set, because a document has been deleted from the set, or perhaps because a single document within a set has been changed. It is also contemplated that document set B1 might be considered a version of document set B because all of the documents in set B have been completely replaced. Again, it is up to the user of the system to decide which document or document set shall be considered a new version of a previous document or document set.

Figure 7:
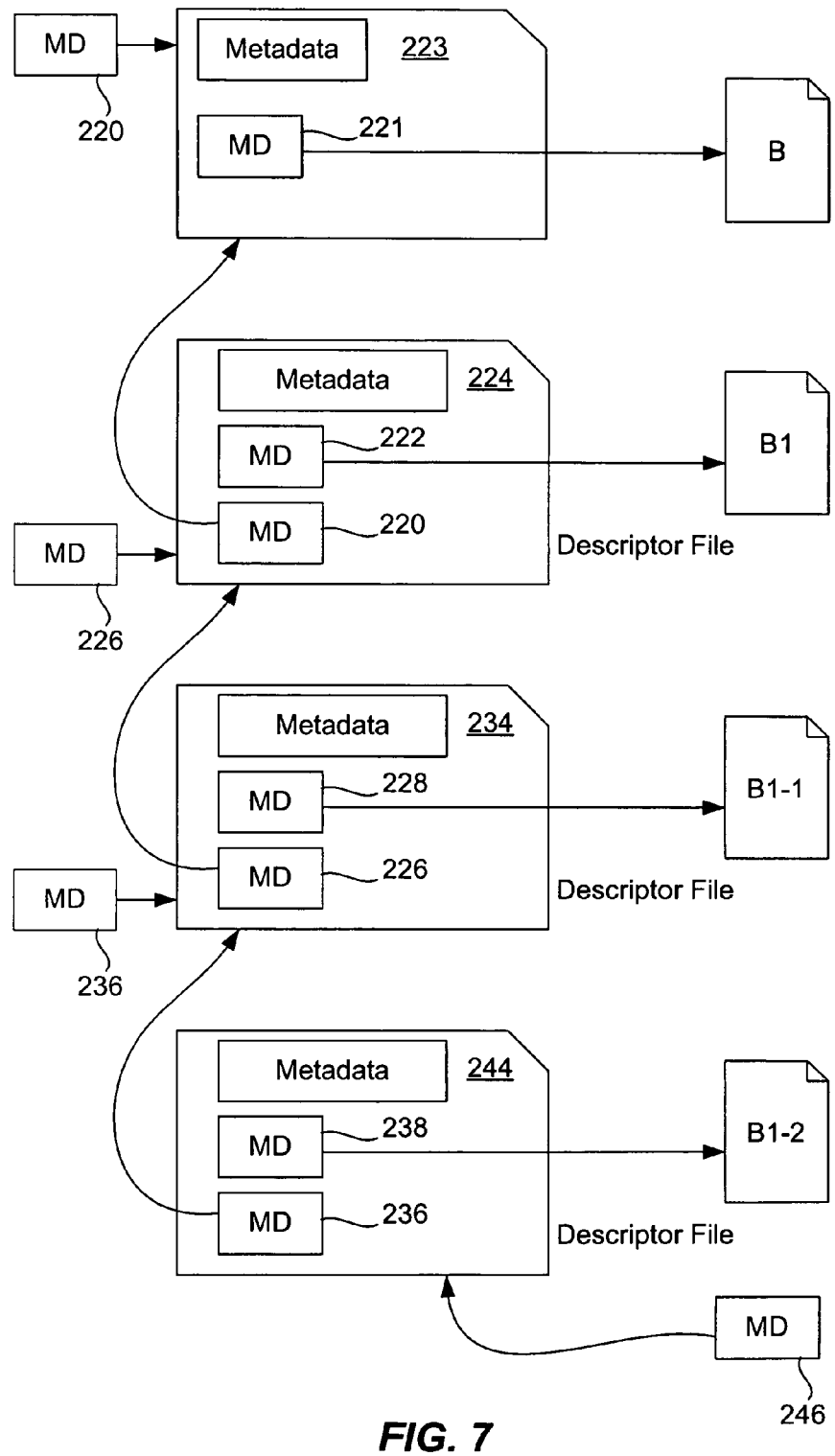
FIG. 7 illustrates in detail how a user may navigate backward over versions according to an embodiment of the present invention.

FIG. 7 illustrates in detail how a user may navigate backward over versions according to an embodiment of the present invention and reference will be made to this figure in the discussion of FIG. 8. The present invention contemplates system software (the "system") running on a computer with which a user interfaces to execute the various embodiments of the present invention. The system creates message digests, stores documents, retrieves documents based on message digests, facilitates backward and forward navigation over versions, facilitates circular navigation, and provides the user interface with which the user interacts. Such a system may be implemented on a single stand-alone computer, on distributed computers, or may be accessible over the Internet as will be appreciated by those of skill in the art. Upon a reading of this disclosure, one of skill in the art will be able to make and use the various embodiments of the present invention using any suitable computing environment.

Figure 8:
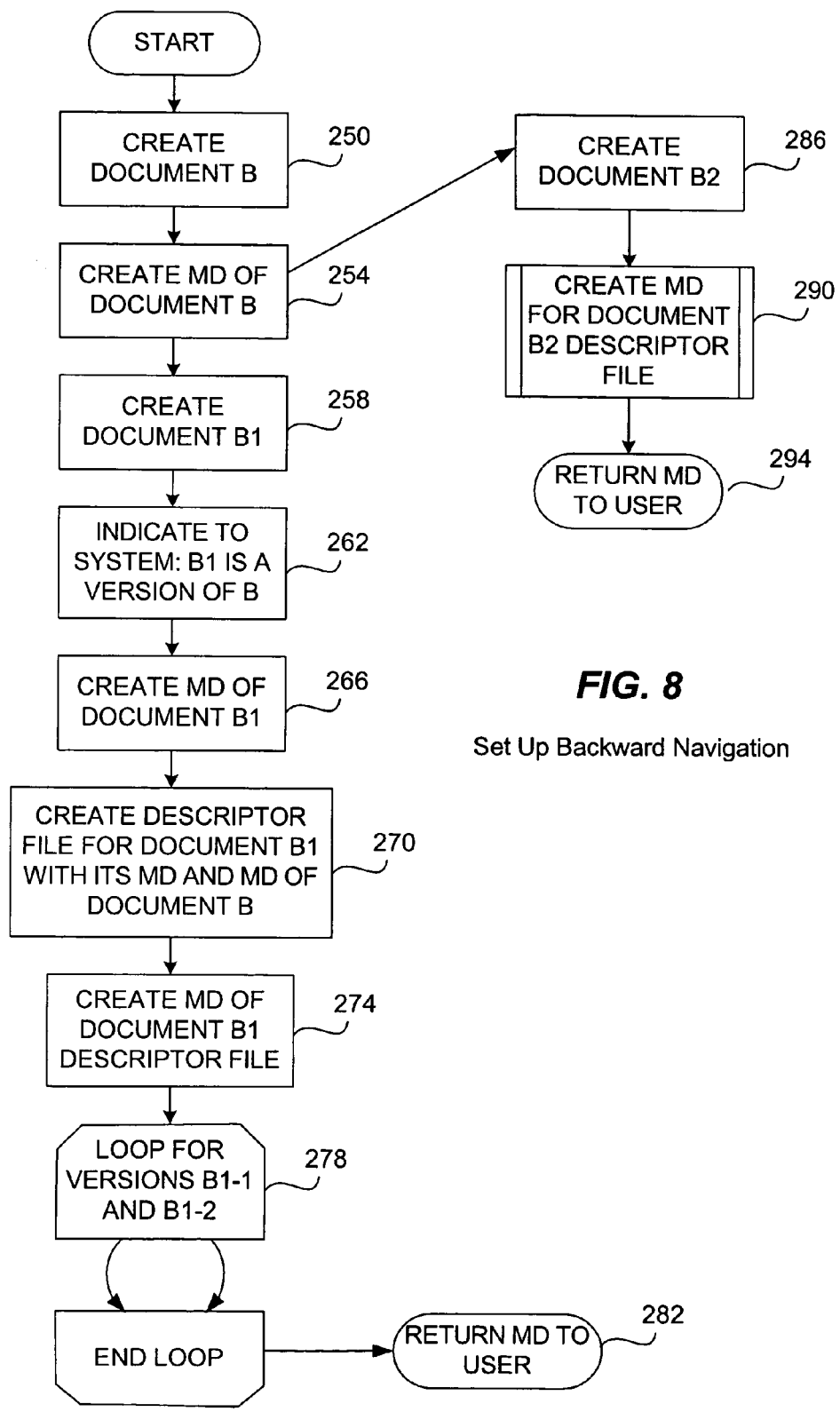
FIG. 8 is a flow chart describing how the system sets up and enables backward navigation over versions.

FIG. 8 is a flow chart describing how the system sets up and enables backward navigation over versions. In step 250, the user creates or otherwise obtains document B. The user may also be provided with a message digest that identifies document B. Document B is any document or set of documents for which it is anticipated that versions will be created. In step 254, the system creates message digest 221 of document B, file 223 and message digest 220 (if not already provided). In step 258, the user creates or otherwise obtains document B1. In this example, the user intends that document B1 be considered a version of document B, for example, document B1 is the marketing version of document B.

In step 262, the user indicates to the system that B1 is a version of document B. At this point, the system understands that a new version exists, and thus takes steps to enable the later backward navigation over these versions. In step 266, the system creates message digest 222 of document B1. In step 270, the system creates a descriptor file for document B1 that includes MD 222 and the message digest 220 for descriptor file 223 that contains MD 221 of document B. Optionally, meta data is also included. In step 274, the system creates message digest 226 of which identifies descriptor file 224 for document B1. At this point in time, MD 226 may be supplied to the user as a unique identifier for the latest version of document B. As will be later described herein, the user may use MD 226 to not only access document B1 but also to navigate backward to original document B.

Assuming that the user now also adds document B1-1 and B1-2 and intends that these be considered later versions of original document B, the system performs a loop in step 278 using the technique described in steps 258-266 to create descriptor files 234 and 244. In the course of creating these files, message digest 246 is created which identifies descriptor file 244. As will later be described, the user may use MD 246 to not only view the latest document B, but also to step back through each version ultimately to original document B.

Returning now to step 254, we consider the situation in which the user (or a different user) wishes to create a different version of document B, namely document B2. In this example, we assume that document B2 is the engineering version of document B. It will be appreciated that the user who creates document B2 need not be the same user who created B1, and in fact, the users need not be aware that the other is creating a different version. Further, there may be any number of versions of document B each created by a different user who is unaware that other users are also creating versions of document B.

In this example, a user creates document B2 in step 286. In step 290, utilizing the techniques of steps 262-274, a message digest of a document B2 descriptor file is created and returned to the user in step 294. Using this message digest, the user may view the latest engineering version of document B, namely document B2, or may backwards navigate to the original document B. It will be appreciated that MD 246 is returned to the user in the marketing department in order to view the latest marketing version of document B, while the message digest created in step 290 for document B2 is returned to the user in the marketing department to view the latest marketing version of document B. These are different message digests intended for different purposes and can be stored, labeled and referenced in any suitable manner to indicate that these message digests identify different versions of document B, namely a marketing version and an engineering version. One of skill in the art will realize that any number of users may each create their own message digests referring to what they consider to be "their" version of a content space at a particular point in time. For example, while MD 246 identifies the latest marketing version of document B, a user may wish to only refer to MD 236 as the identifier for the latest version of that document. In that scenario, the user would be making a choice that they consider document B1-1 to be the latest version of document B for their own purposes.

In order to backward navigate over versions, the user interacts with the system software as is now described with reference to FIG. 7. Assuming that a user in the marketing department wishes to view the latest marketing version of document B, or one of the earlier versions, the user obtains MD 246 which is known to be the message digest for the engineering version of document B. The user provides MD 246 to the system that is then able to uniquely identify descriptor file 244 and retrieve it. Upon opening file 244, the system presents to the user through a suitable interface, either MD 238 (that provides a link to document B1-2), or MD 236, that identifies the next most recent version of the document. Implementation of a descriptor file and how the system uses a descriptor file to follow links may be implemented in various ways. For example, the implementation may simply assume that the message digests listed within a descriptor file are always in a particular order, and that the first message digests identifies the current version of a document, while the second message digest provides a link back to the next most recent version. Alternatively, meta data within the descriptor file may provide a table or other information that indicates which message digest references which documents.

In this example, the user can select, click on, or otherwise identify MD 236 as the link of interest, which then provides a reference to descriptor file 234. Once obtaining file 234, the system may then provide the user with a choice of either reviewing document B1-1 using MD 228, or progressing further backwards using MD 226. By selecting MD 226, the system then retrieves descriptor file 224. The user then has a choice of reviewing document B1 via MD 222, or viewing original document B using MD 220. In this fashion, a user is able to backward navigate over versions of a document by simply starting with a single message digest 246 that uniquely identifies a particular content space having versions of a string of documents.

Figure 9:
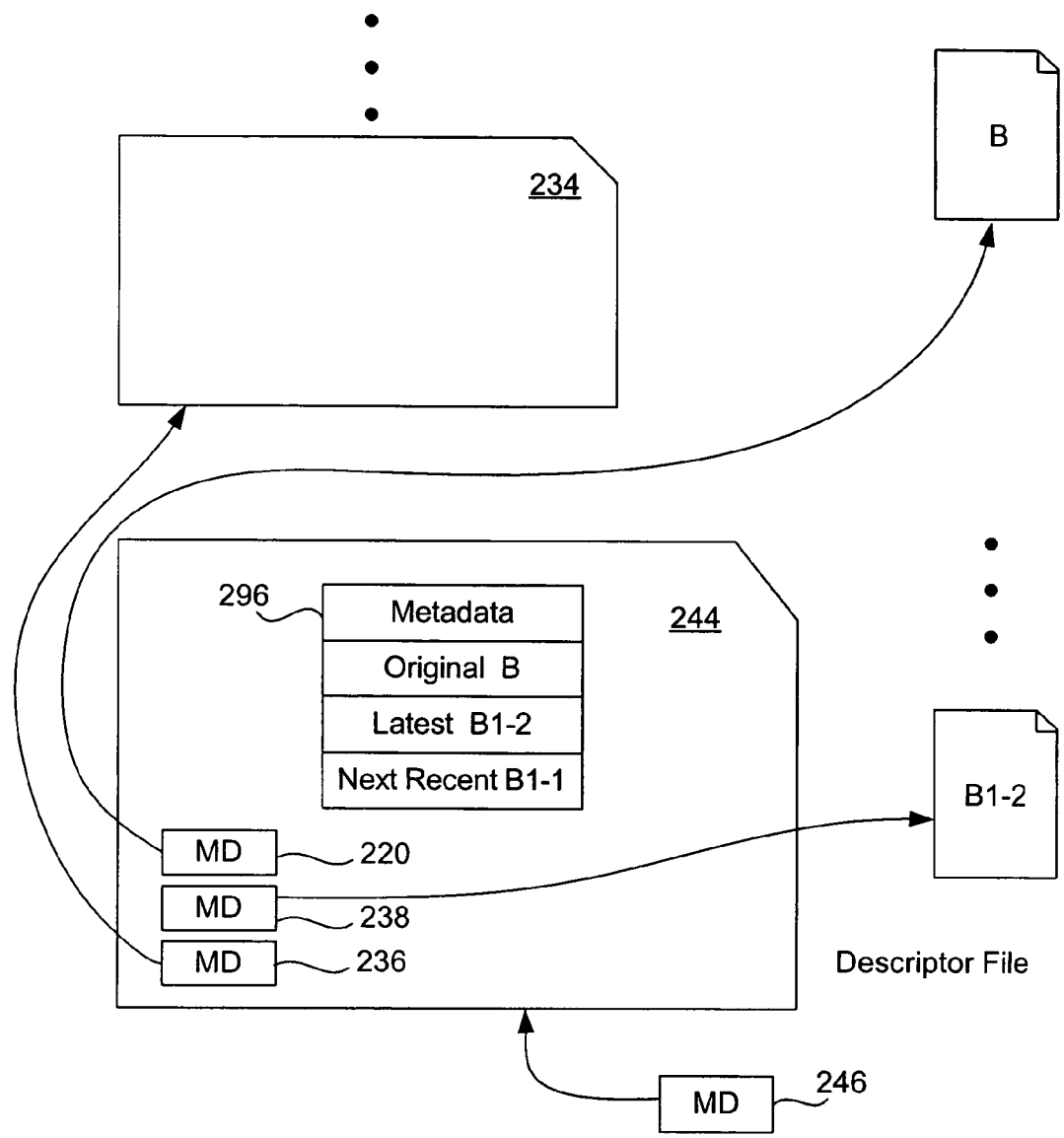
FIG. 9 illustrates an alternative embodiment of backward navigation in which a user is allowed to immediately jump to the original version of a document.

FIG. 9 illustrates an alternative embodiment of backward navigation in which a user is allowed to immediately jump to the original version of a document without needing to step through each of the later versions of that document. In this embodiment for backward navigation, the user may indicate to the system at the outset that he or she wishes to use MD 246 to view the original document. In this embodiment, the system then automatically follows the message digest links backwards until it finally reaches MD 220 and is able to identify and present document B to the user. Retrieving, opening and using the message digests of descriptor files 244, 234 and 224 is done automatically by the system and is transparent to the user. In this fashion, the user can immediately navigate to the original document using the set up that has been performed in FIG. 8.

In this embodiment, the system always inserts MD 220 (that uniquely identifies original document B) into each of descriptor files 224, 234 and 244. It may be inherently understood by the system that the first message digest listed within the descriptor file is always the message digest of the original document, or the meta data within a descriptor file may be used to indicate that the message digest for the original document is present within the file.

In this fashion, then, during loop 278 when descriptor file 234 is being created, the system not only inserts MD 226 within descriptor file 234, but it uses MD 226 to obtain on the fly descriptor file 224 and to retrieve MD 220, which is the message digest for original document B. The system is then able to insert MD 220 into descriptor file 234. In the same fashion, when descriptor file 244 is created, MD 220 can also be inserted into file 244.

FIG. 9 shows an implementation of this embodiment in which the descriptor files have been modified so that each includes MD 220, the message digest of the original document. For clarity, not all the documents or descriptor files are shown in this figure. Descriptor file 244 lists the message digests in a particular order: the first message digest, MD 220, identifies the original document; the second, MD 238, identifies the current version of the document that the user can view; and the third, MD 236, identifies the next most recent version of the document. If implemented in this fashion, it is not strictly necessary that additional meta data be added to indicate which message digest identifies the original document.

In one embodiment, though, meta data is added to indicate which message digest is which. Meta data 296 is added in the form of a table, list or other data structure in order to identify which message digest in descriptor file 244 identify which documents. Meta data 296 presents two columns, the first column providing a description that describes what a particular document is, while the second column provides the name of the document. The order that the documents appear in this table are understood by the system to mean that the message digests for these particular documents are also listed in the same order. Alternatively, table 296 may be expanded with the third column to contain the actual message digest for the particular document.

In this example, when the user presents MD 246 to the system and indicates he or she wishes to view the original document, the system identifies and retrieves descriptor file 244. Then, using meta data 296 (or using an inherent understanding of which message digest references the original document) the system obtains MD 220 and can immediately identify and locate original document B for the user. The system may also allow the user to view the latest document B1-2 or to backward navigate over previous versions as has been previously described.

Figure 10:
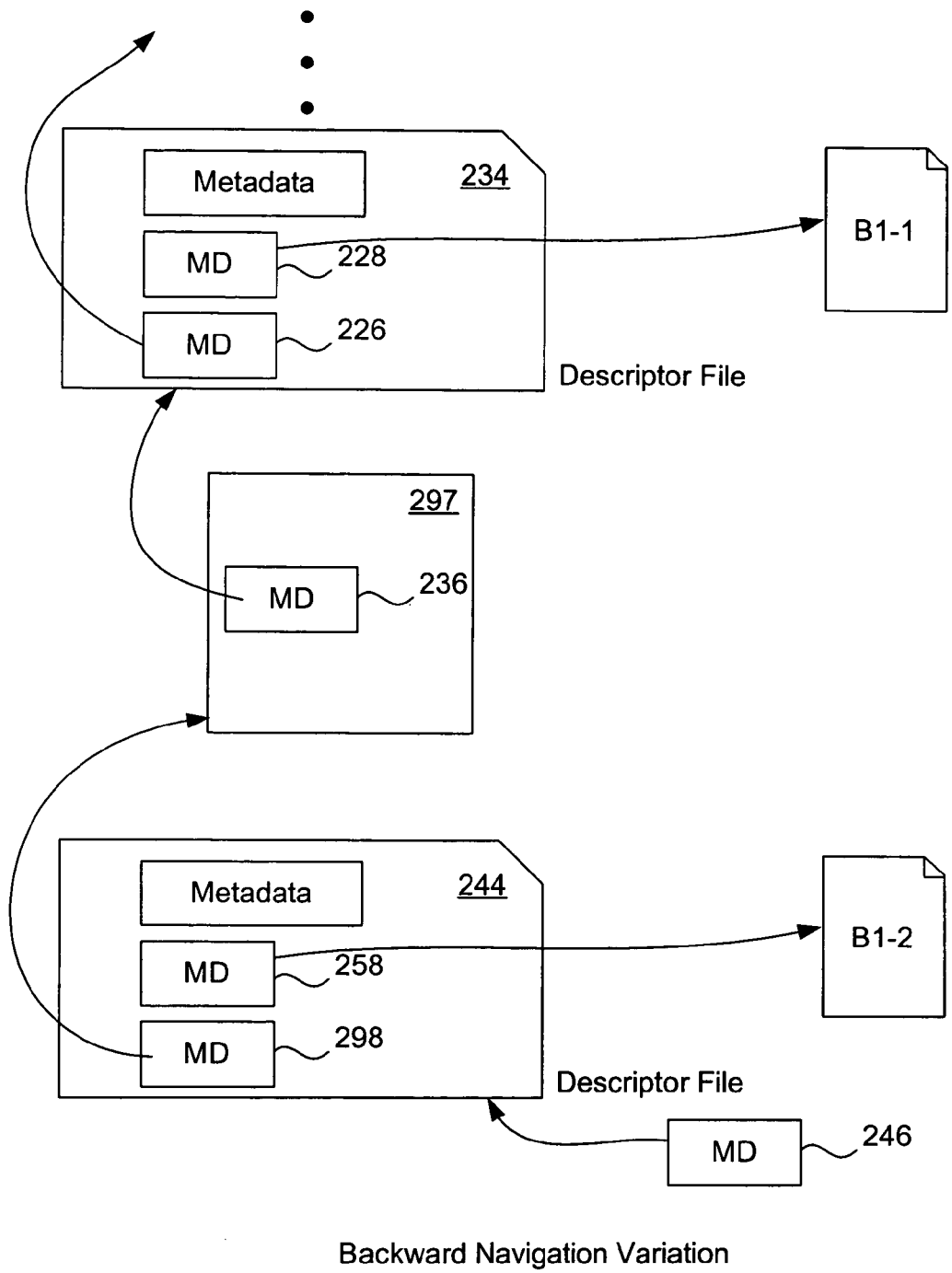
FIG. 10 illustrates a variation of backward navigation using an intermediate file.

FIG. 10 illustrates a variation of backward navigation using an intermediate file. FIG. 10 shows only a portion of the files and documents from FIG. 7 for ease of explanation. As before, shown are descriptor files 244 and 234 which contain message digests for documents B1-2 and B1-1. In this variation, though, a message digest within file 244 does not directly reference descriptor file 234 but instead references an intermediate file 297. In other words, an intermediate file 297 is created during the backward navigation set up process that does contain MD 236 that identifies descriptor file 234. A hash function is used to create a hash value for file 297, namely, MD 298. MD 298 is then placed within descriptor file 244.

In this fashion, an additional level of indirection is provided as a user backtracks over previous versions. Additional steps are added to the flow chart of FIG. 8 at step 270 to accommodate the intermediate file. For example, before descriptor file 244 is created, intermediate file 297 is created with MD 236. The message digest for file 297 is then placed within the newly created descriptor 244 along with MD 238. An intermediate file may be created for each version in a chain of versions. It is also possible to create more than one intermediate file between versions to provide additional levels of indirection if desired. For example, instead of having a single file 297 between versions B1-2 and B1-1, there may be two or more intermediate files between descriptor files 244 and 234. File 297 may be any suitable computer file. By way of example, file 297 is a "shortcut" file or link file available in the Microsoft operating system. Other types of files include a URL file, an XML file, an HTML file, a text file, etc.

Backward Navigation Example

Figure 11:
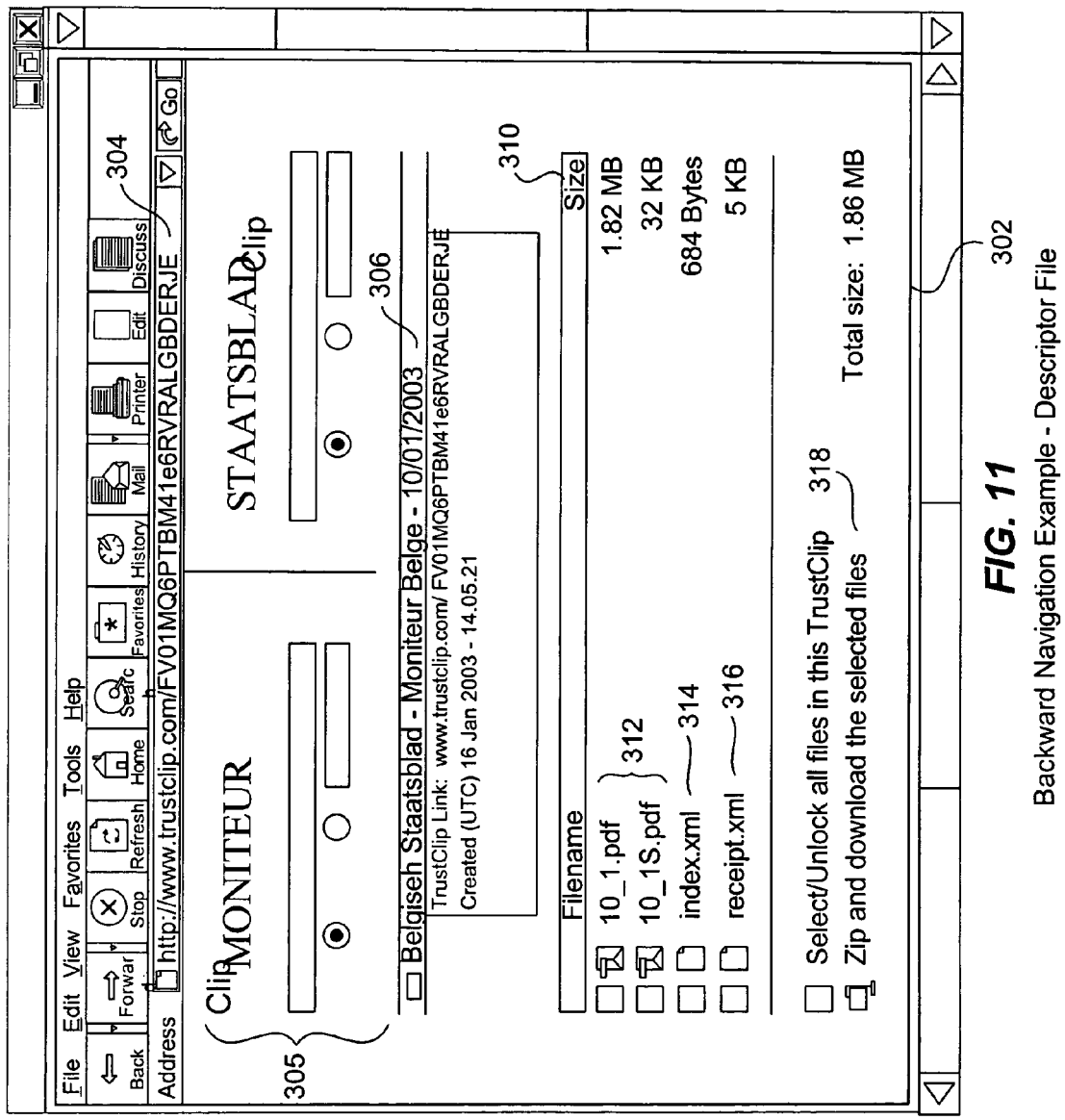
FIG. 11 shows one presentation of the contents of a descriptor file in the present example.
Figure 12:
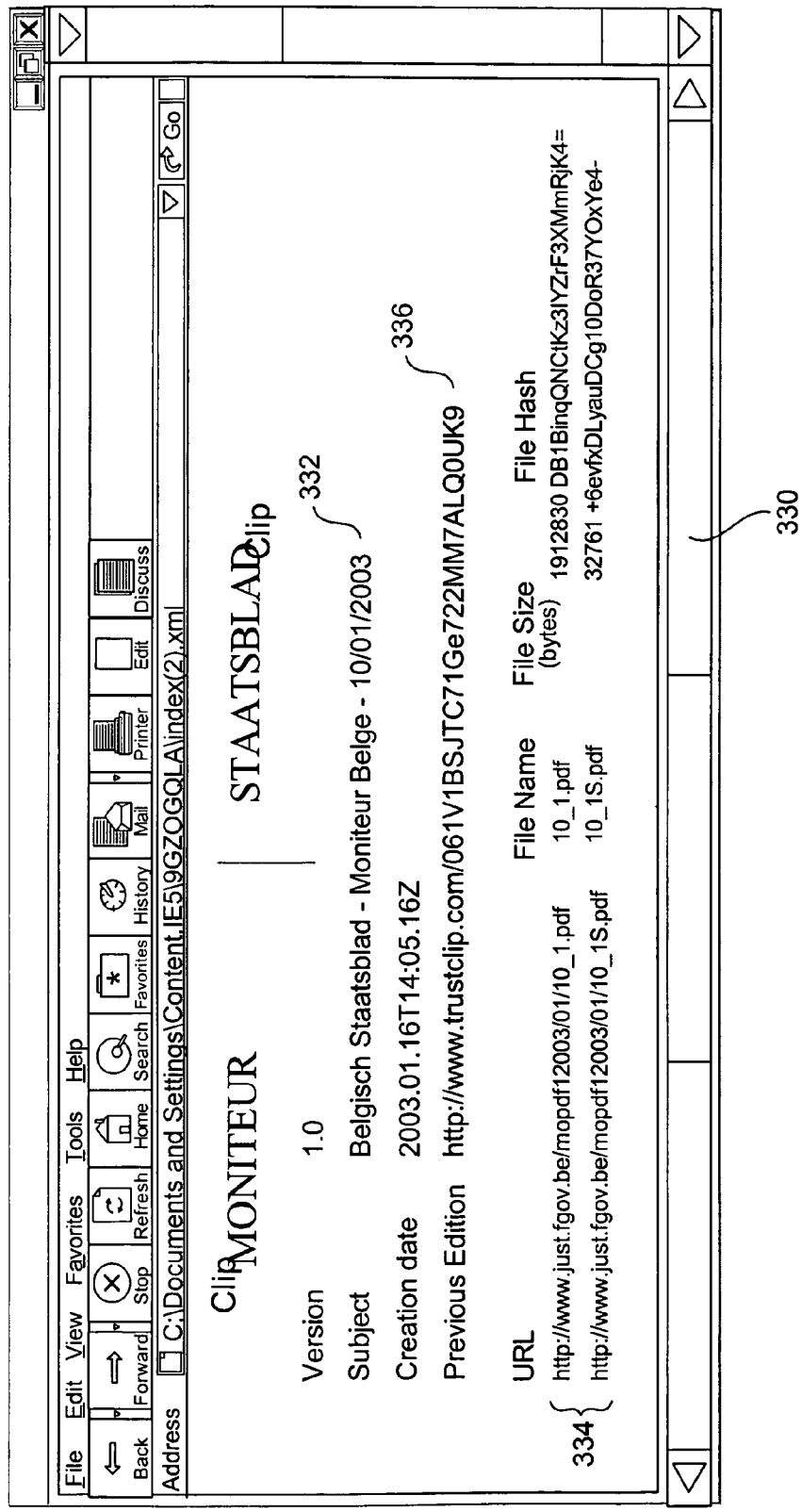
FIG. 12 shows one presentation of the index file referenced in FIG. 11.
Figure 13:
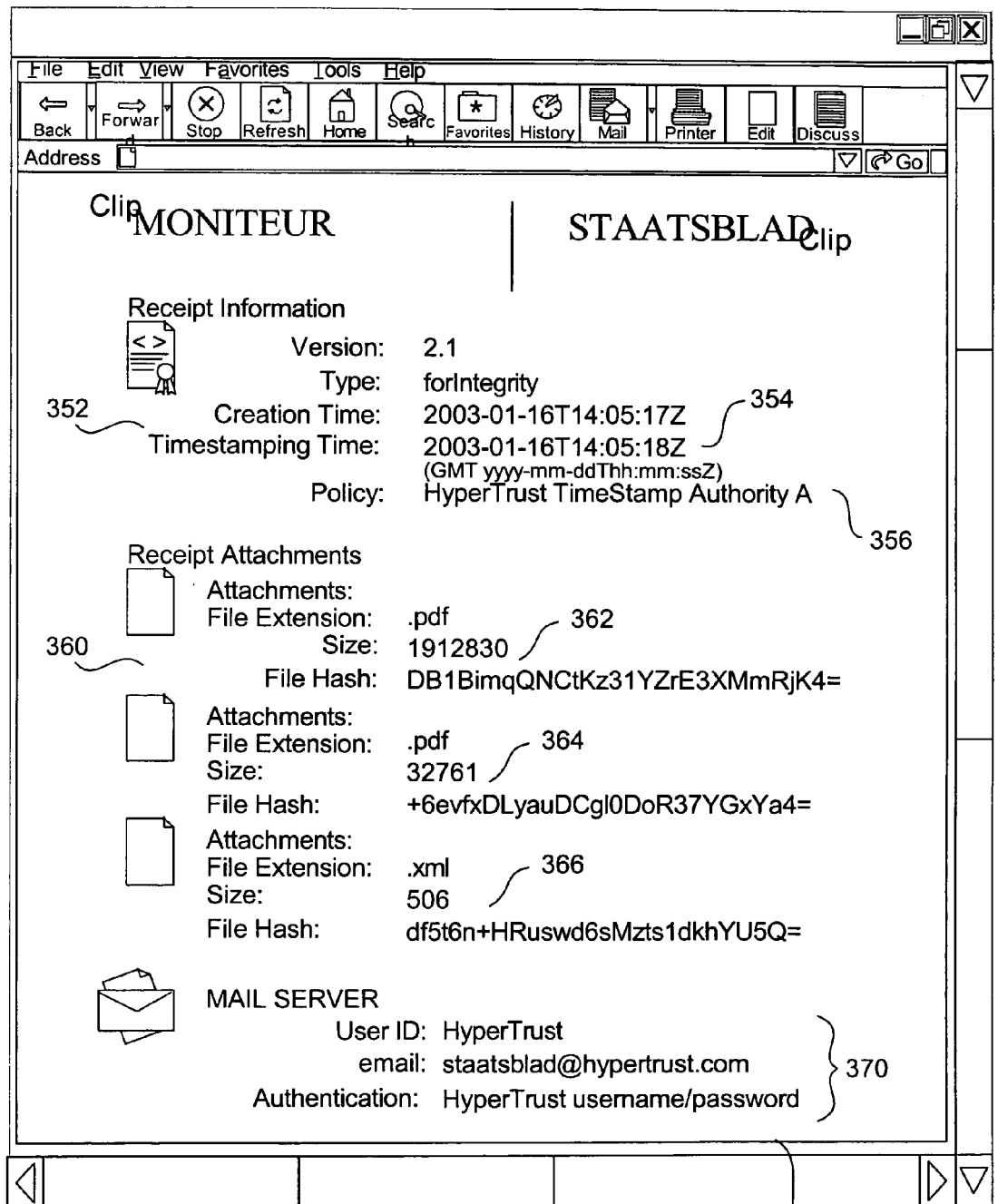
FIG. 13 shows one presentation of the contents of the receipt file referenced in FIG. 11

FIGS. 11-13 present an example of the use of backward navigation. In some situations, it may be useful to not only backward navigate through earlier versions of the document (or of a document set), but also to be able to prove that the earlier versions are true copies of the original documents. This example shows how an embodiment of the present invention can be used to validate versions of a document and to prove that the copies retrieved are true copies of the original documents.

In many situations, documents and later versions of those documents are published electronically, and these electronic documents are the official or reference versions. It can be useful to prove at a later point in time that the versions of these electronic documents that are retrieved from a computer are in fact true copies of the originals. As an example, consider the official journal of Belgian law called the "Staatsblad." The Belgian government has recently ceased publishing this official journal on paper, and now only publishes this journal electronically by making it available on a web site.

A problem exists, though, because it can be difficult to prove that a particular document retrieved years later, or printed years later, is in fact a true copy of what was originally published on the Staatsblad web site. Because the official journal is only published on the web site, it is possible that a hacker could illegally modify the legal documents on that site. Because no other official versions exist, it can be difficult to prove the correct content of the legal document. Additionally, an unscrupulous party could download an official legal document, modify it for their own fraudulent purpose, and then claim that the version they have is a true copy of the original. If there is no way to prove that the electronic documents on the official web site are the true documents, the party might then claim that the website had been modified by a hacker or by an adverse party. The following uses as an example legal documents published electronically by the Belgian government to show how any party in later years can be certain that the documents and earlier versions obtained from such a web site are in fact true copies of the original documents.

FIG. 11 shows one presentation of the contents of a descriptor file in the context of the present example. In this example, the system has presented an interface window 302 to a user in response to having received a URL 304 that uniquely identifies a descriptor file. A wide variety of computers and software may be used to implement the present invention. In this example, a PC-compatible computer running the Microsoft operating system has used an Internet browser to access the website "trustclip.com." The user has provided to the browser a URL 304 that includes not only the domain name but also a 27-character string that symbolically represents a 128-bit message digest or hash value. In response to receiving this message digest, the system software running on the domain server has located in its content-addressable storage the descriptor file that is uniquely identified by that message digest. Window 302 now shows the presentation of the information from that descriptor file along with other information. Heading 305 introduces the application by providing a title in both French and Flemish, along with an invitation to provide an e-mail address for subscribing to the service. Date 306 indicates that the URL 304 provided to the system is a unique reference to Belgian laws published electronically on Jan. 10, 2003.

File names 308 indicate the files that are available through the descriptor file that has been identified by URL 304. A size 310 indicates the size of each file. As has been previously explained, the file names and sizes and other information are preferably stored in the meta data of the descriptor file, while a list of message digests found in the descriptor file provide links that identify uniquely each of the four files listed. In this example, the content-addressable storage of the server also stores these files and is able to locate and access each file based on its message digest using techniques that have been previously described or that are available in the prior art.

The two PDF files 312 are the content files that provide a summary and full description of the Belgian laws published electronically on Jan. 10, 2003. (Although only two content files are shown, it is possible for any number of files to be referenced within the descriptor file.) Index file 314 is an XML file that provides an index of the content available as well as a link to a previous version of the content. Receipt file 316 is an XML file that provides a time stamp and digital signatures that certify beyond question that the content therein and the link to a previous version are true and accurate representations of what was originally published electronically as the official law on that date. Option 318 provides the user a way of downloading the selected files. Thus, a simple URL 304 (that contains a message digest) provides any user with access to not only the official laws published on a certain day, but also with access to guaranteed true copies of previous versions as will now be explained.

FIG. 12 shows one presentation of the index file referenced in FIG. 11. Window 330 provides one possible view of the content of the index file as presented in a browser window. Of course, other techniques of presentation and other software may be used to view the contents of the index file or to present its information. Date 332 indicates the contents refer to laws published on Jan. 10, 2003. File list 334 lists a URL where each file may be retrieved from the official government site, a file name, a file size and a file hash value. In this example, the file hash value for each file shown in list 334 is not the same hash value that is used to reference a particular content file 312 from within the descriptor file. In this example, the hash values in list 334 have been computed using a different hash function to provide further identification of the documents. Depending upon the implementation, the user may retrieve the documents using the URL provided in list 334 and may then authenticate the contents using the provided hash value, or the user may use window 302 to download a particular PDF file 312 that has been stored in the content-addressable storage of domain "trustclip.com."

URL 336 provides a link to the previous edition of these documents that had been published Jan. 9, 2003. In this example, a domain name is concatenated with the message digest thus allowing the user to simply and easily link to the site "trustclip.com" in order to have the descriptor file corresponding to the listed message digest retrieved. URL 336 uniquely identifies a descriptor file that references an earlier version of the documents just as URL 304 provides a unique link to the current version of the documents as published on Jan. 10, 2003. Although not shown in this example, one of skill in the art will appreciate that by following URL 336, the user will then be presented with a window very similar to window 302 that presents the contents of a descriptor file with links to the previous versions of these documents along with corresponding index file and receipt files.

As has been previously explained in various embodiments, the contents of the descriptor file shown in window 302 include a message digest that uniquely identifies the index file of FIG. 12. Because URL 336 is part of the index file, and because the index file is then hashed and its message digest placed within the descriptor file shown in 302, it can be validated beyond a reasonable doubt that URL 336 is a true and correct link to a previous version. In other words, it would be nearly impossible for a hacker to modify the content of the index file or to modify the message digest shown in URL 336. It is worth noting that the index file makes use of the variation explained in FIG. 10. In this example, the message digest 336 referring to an earlier version is not contained directly within the descriptor file show in window 302, but digest 336 is contained within the index file, the index file being referenced by the descriptor file. In other words, the index file is an intermediate file that provides an additional level of indirection to reach an earlier version.

FIG. 13 shows one presentation of the contents of the receipt file referenced in FIG. 11. In this example, window 350 presents contents of the receipt file within an Internet browser window. Portion 352 presents general information regarding the receipt file including a version, type and creation time. A time 354 provides the exact time when the receipt file is time stamped. In this embodiment, special hardware approved by European legislation of October 2000 has been used to provide a time stamp. Policy 356 indicates the particular policy followed by an authority under guidelines established by the European legislation. As will be appreciated by one of skill in the art, any of a variety of time stamping policies and hardware may be used to provide a time stamp that is authentic and verifiable. The method of providing the time stamp and its exact nature may very well vary depending upon the jurisdiction, the type of application and the particular implementation.

Attachments 360 lists the attached files (other than the receipt file) that are included within the descriptor file contents as shown in window 302. Files 362 and 364 refer to the first and second PDF files, indicating their extension, size and file hash values. File 366 refers to the index file, also listing a hash value for the index file. By providing a hash value for the index file within the receipt file (the receipt file itself also being hashed), further certainty is provided that the contents of the index file (including a link to the previous version) cannot be tampered with.

Section 370 concerns the digital signatures and the authority that provided them, namely, the entity HyperTrust. This section establishes that the entity "HyperTrust" was the entity that created these files and digitally signed them. The actual digital signatures are not shown in this figure, but can be found in the underlying XML representation of this receipt file. Use of digital signatures to verify the content of a file, authenticate who has signed the information, etc., are techniques well known to those of skill in the art. Thus, through use of the index and receipt files, a user is provided with certainty that when they view the latest version of a document that not only is that document authentic, but also that earlier versions of that document that they retrieve are also authentic versions.

Forward Navigation

Figure 14:
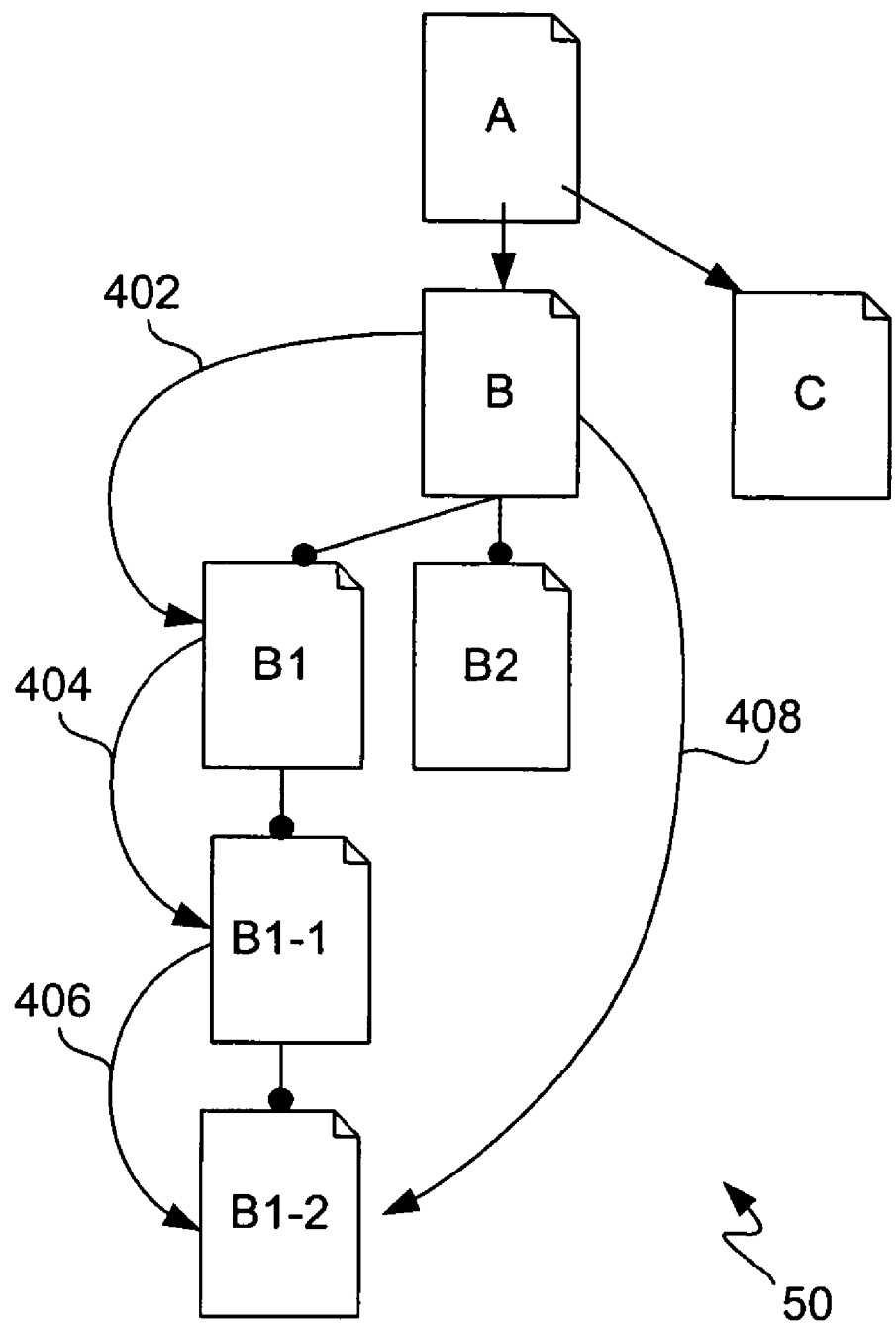
FIG. 14 illustrates a content space in which a user desires to navigate forward over versions.

FIG. 14 illustrates content space 50 in which a user desires to navigate forward over versions. In this example, a user having document A wishes to view the subsequent versions associated with document B, for example, by following links 402, 404 and 406. Or, the user wishes to view the latest version of document B by following a link 408 directly from document B to document B1-2. In another embodiment, the user is in possession of document B, or perhaps a message digest that identifies document B and wishes to view its later versions. The following example addresses the situation in which the user has document A that includes a message digest for document B. Should the user wish to start from document B, descriptor file 446 would contain MD 428 rather than MD 418, and the message digest created for descriptor file 446 would not be MD 418', but would be labeled 428', to reflect that MD 428' allows forward navigation from document B (whose message digest is originally MD 428).

Figure 15:
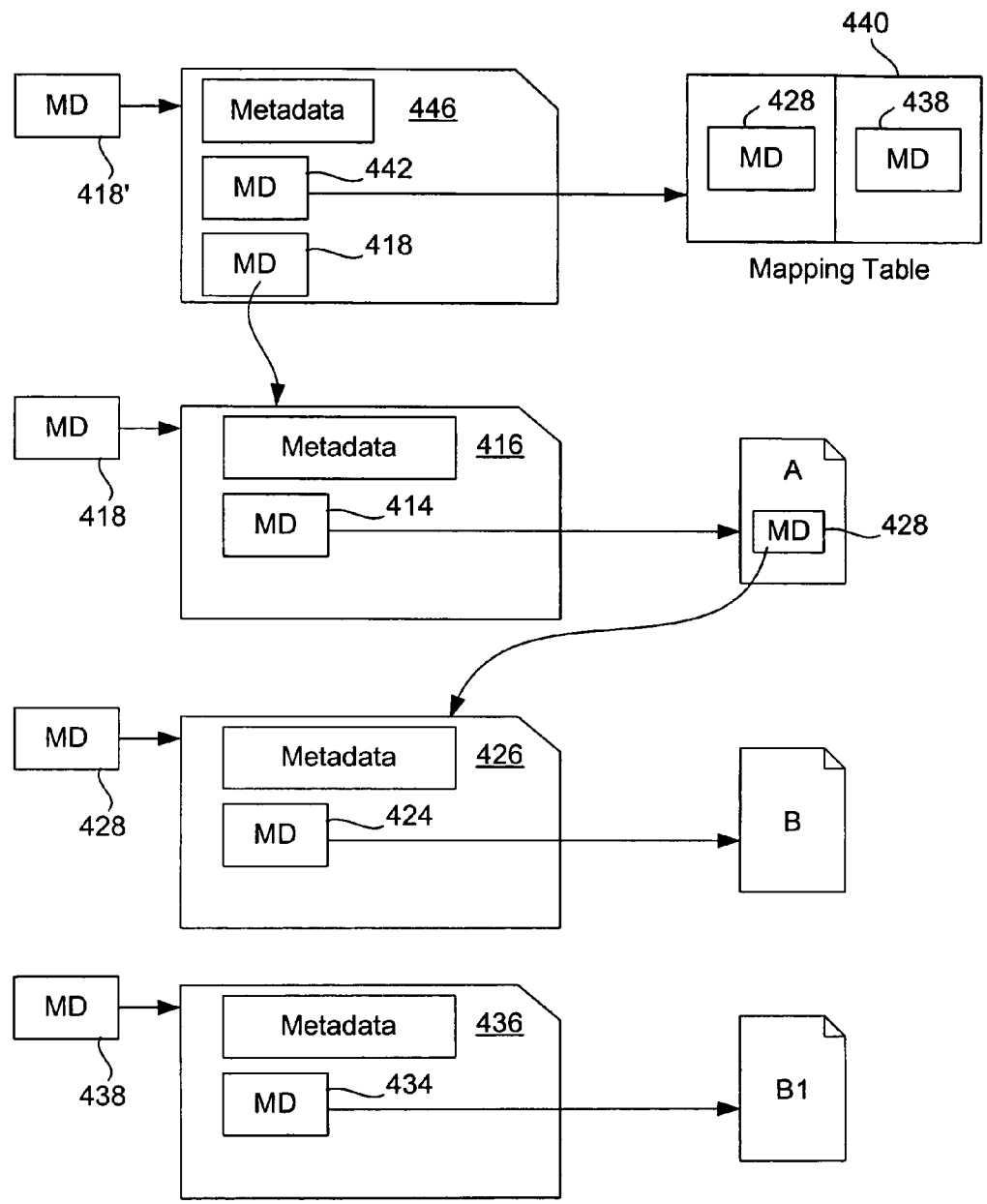
FIG. 15 shows in detail a technique for performing forward navigation.

FIG. 15 shows in detail a technique for performing forward navigation. At the outset, consider a situation in which the user has a particular document A and the system has created a message digest 414, a descriptor file 416 and a corresponding message digest 418 to allow the user to uniquely identify document A using MD 418. Document A includes a reference to document B. In this example, message digest 428 references document B via descriptor file 426 and message digest 424, MD 428 being embedded within document A. In this fashion, a user in possession of MD 418 can uniquely identify document A and find a link that uniquely identifies referenced document B. At a certain point in time, though, the user wishes to create a document B1 and to enable forward navigation to that document. From this starting point, we now turn to the next figure that explains how this process occurs.

Figure 16:
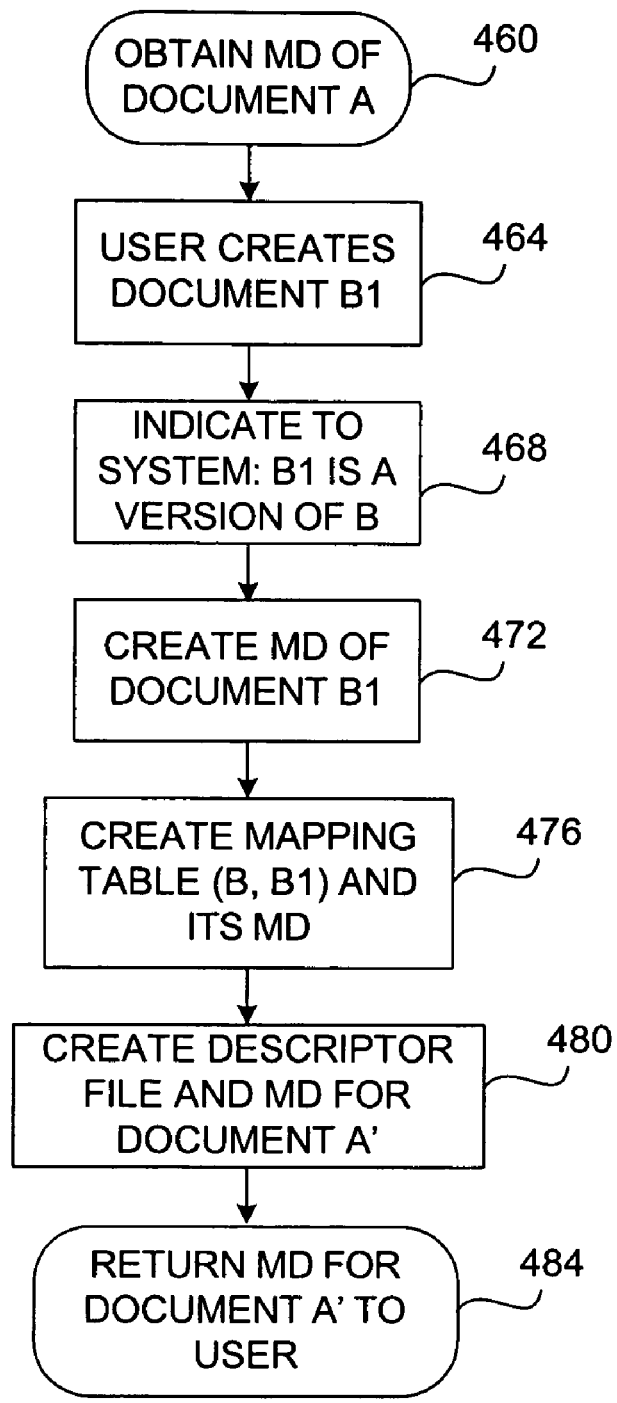
FIG. 16 is a flow chart describing a procedure for setting up forward navigation.

FIG. 16 is a flow chart describing a procedure for setting up forward navigation. In this situation, we assume that documents A and B and their associated message digests already exist as has been previously explained. To begin with, in step 460 the user obtains MD 418 which is the message digest used to identify document A (and any referenced documents such as document B). In the following example, we assume that a descriptor file is created for each document and that a corresponding message digest is created for each descriptor file. In this embodiment, the meta data of each descriptor file may be used to provide information such as file name, creation date, etc. This is a preferred embodiment, although in situations where a descriptor file is not strictly necessary, a message digest for a particular document may identify that document directly rather than use an intermediate descriptor file. For example, MD 428 identifies descriptor file 426 that contains MD 424 that directly identifies document B. In other embodiments, MD 424 may be directly embedded within file A such that descriptor file 426 is not strictly necessary. A descriptor file is generally useful, though, by providing the possibility to refer to multiple files at once, and by providing meta data.

In step 464, the user creates document B1. Alternatively, the user may obtain document B1 from somewhere else, or may simply be given the message digest for document B1 or the message digest of the descriptor file for document B1. In step 468 the user indicates to the system that document B1 shall be considered a version of document B and that it is desired that forward navigation be enabled for future use. In step 472 the system creates message digest 434 of document B1 (unless it had be previously provided). Preferably, the system also creates descriptor file 436 and message digest 438 that identifies that descriptor file and indirectly document B1. To enable future forward navigation, in step 476 the system creates mapping table 440 by creating a single record that maps MD 428 to MD 438. In other words, MD 428 (that identifies document B) is mapped into MD 438 (that identifies document B1). Thus during forward navigation, the mapping table is used to indicate to the system that whenever MD 428 (document B) is encountered, MD 438 (document B1) should be used in its place. In this fashion, the system can jump from document B to document B1. The system also creates message digest 442 to identify the mapping table.

In step 480, the system creates descriptor file 446 by including MD 442 and MD 418 which originally was used to identify document A. A message digest 418' is then created to identify descriptor file 446. In step 484, MD 418' is returned to the user as the message digest to be used to perform forward navigation from document A to a version of document B.

It should be noted that mapping table 440 is a very simple version of a mapping table having only one entry. A mapping table may have any number of entries that each map one message digest into a different message digest thus providing forward navigation. For example, should document B actually be a document set containing many documents, then the mapping table would have many entries, each entry mapping a message digest for an old version of a document to a new message digest for a new version of a document, where a message digest directly identifies a document. A mapping table may have many entries in another situation shown in FIG. 20. In a situation where a message digest identifies a descriptor file that holds message digests for multiple documents, and the mapping table maps descriptor file message digests, there may only be one entry in the mapping table.

In another embodiment, mapping table 440 need not exist as a separate table or file outside of descriptor file 446, but may reside within file 446 as meta data. In this case, MD 442 would not be needed. The advantage of the mapping table is that because it can be implemented as a simple table or file, it can be stored directly within the descriptor file or its message digest calculated and the mapping table stored elsewhere. By virtue of its hash value being computed (for the table itself or as part of a descriptor file), the mapping table and its contents can be validated and later verified. A mapping table may be implemented as any type of file or table. In one embodiment, the mapping table is implemented as an XML file. And while mapping table 440 shows message digests which actually identify descriptor files being mapped to one another, it is also possible to map message digest that identify documents directly from one to another. For example, while mapping table 440 maps MD 428 into MD 438, it is also possible to map MD 424 into MD 434, thus achieving the desired mapping at a lower level. A mapping table may also include useful meta information, e.g., access rights related to forward or backward navigation.

Figure 17:
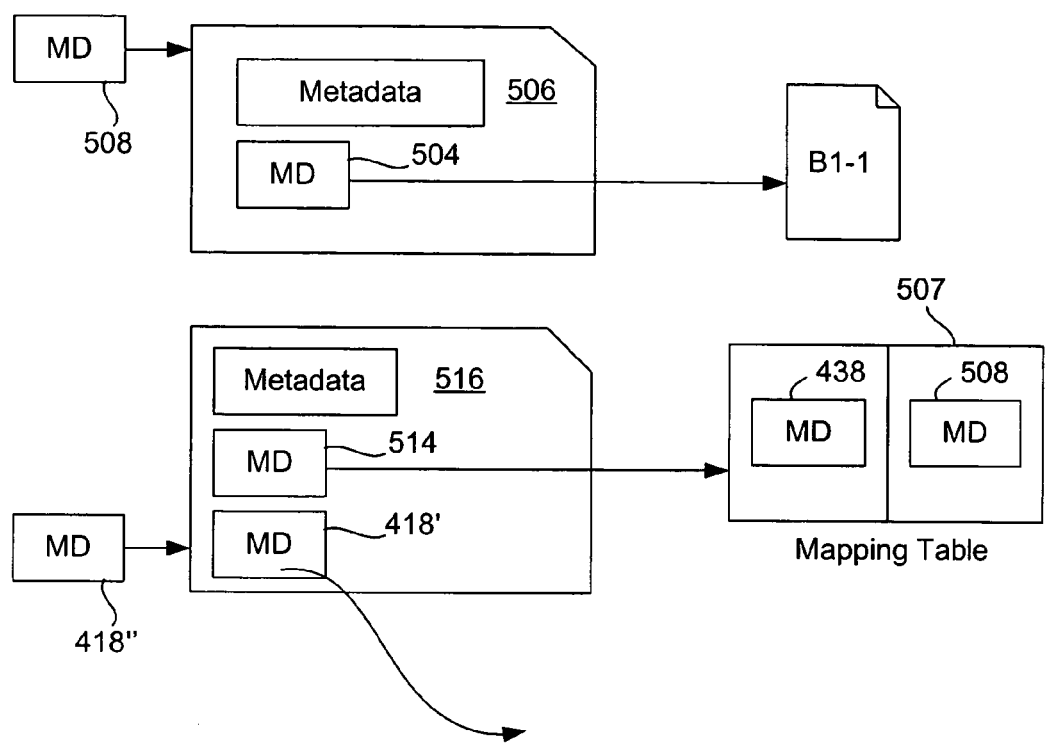
FIG. 17 illustrates a further example of forward navigation.

FIG. 17 illustrates a further example of forward navigation. FIG. 16 has described how a mapping table may be set up to enable future forward navigation when a new version B1 of document B is created. The invention can also handle any situation in which any number of versions of document B are later created. For example, FIG. 17 illustrates how forward navigation is enabled when a new version of document B1 is created, namely document B1-1.

Similar to the technique described in the flow chart of FIG. 16, the user creates or otherwise is provided with document B1-1 and then indicates to the system that document B1-1 shall be considered a new version of document B1. Next, similar to step 472, MD 504 is created along with descriptor file 506 and MD 508. Next, similar to step 476, mapping table 507 is created that maps MD 438 (the message digest referencing document B1) into MD 508 (the message digest referencing document B1-1). MD 508 is a message digest identifying a descriptor file that contains a message digest identifying document B1-1. MD 514 is then created for mapping table 507.

Next, similar to step 480, descriptor file 516 is created that includes MD 514 along with MD 418' (the message digest previously created to allow forward navigation to document B1). Next, MD 418" is created. Finally, MD 418" is returned to the user as being the message digest to be used to forward navigate to document B1-1. When MD 418" is used, mapping table 507 is brought into memory by virtue of its being referenced within descriptor file 516, and mapping table 440 is brought into memory by virtue of it being referenced within descriptor file 446. In this fashion, as the system follows link 418" to link 418' and finally to link 418 that allows access to document A, the system is aware that a message digest identifying document B should be replaced with a digest identifying document B1, and further that a digest referencing document B1 should be replaced with a digest referencing document B1-1. In this fashion, a user may forward navigate over any of a number of versions of a document.

Figure 18:
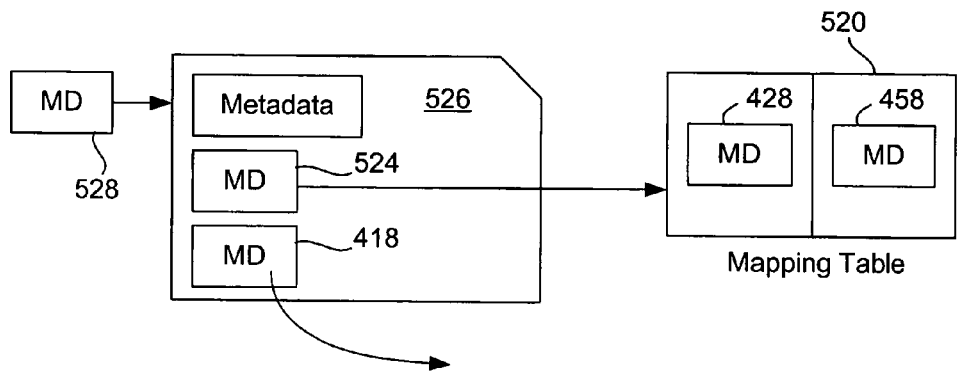
FIG. 18 illustrates a forward navigation technique for jumping immediately to the latest or last version of a document in a chain of versions.

FIG. 18 illustrates a forward navigation technique for jumping immediately to the latest or last version of a document in a chain of versions. For example, consider the situation in which instead of a user creating versions of document B one after another and asking the system to enable forward navigation at each step, the user is presented all at once with the documents of content space 50. In other words, the user either creates or obtains all of the documents of content space 50 at one time and then presents these documents to the system, indicating that B1-1 is later version of document B1, etc. In this situation, and if the user so desires, the system can set up a mapping table that immediately maps document B to the last version created, namely, document B1-2.

Although not shown in FIG. 18, a message digest 458 is created that references document B1-2 (i.e., using a descriptor file). The system then creates mapping table 520 that maps MD 428 (document B) into MD 458 (document B1-2). MD 524 is created for this mapping table and descriptor file 526 is created that also includes original MD 418 that references document A. Finally, MD 528 is created and returned to the user as the message digest to be used when the user wishes to navigate in content space 50 and immediately jump to the last version available of document B, namely, B1-2. When the user provides MD 528 to the system, the system accesses mapping table 520 and follows link 418 to obtain document A. Thus, whenever MD 428 is encountered which references document B, it will be replaced by MD 458 which provides a direct link to document B1-2, the last version of document B available.

Figure 19:
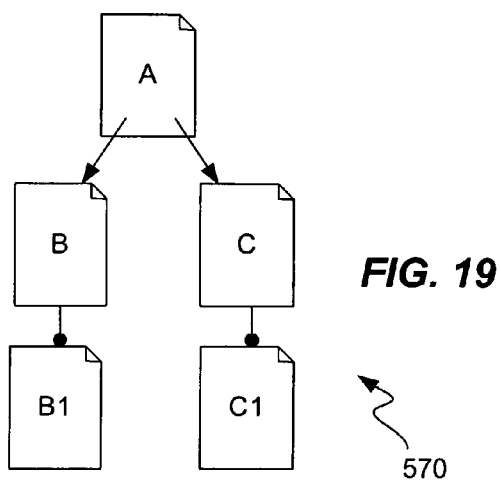
FIG. 19 illustrates a forward navigation scenario in which the mapping table has multiple entries.

FIG. 19 illustrates another forward navigation scenario in which the mapping table has multiple entries. As mentioned earlier, a mapping table may have any number of entries each mapping one message digest into another. For example, consider the content space 570 in which at a certain point in time two new versions of both documents B and C have been created, namely documents B1 and C1. The user now indicates to the system that these new documents shall be considered new versions. Thus, when a user accesses document A, they would wish to forward navigate to the new versions B1 and C1.

Figure 20:
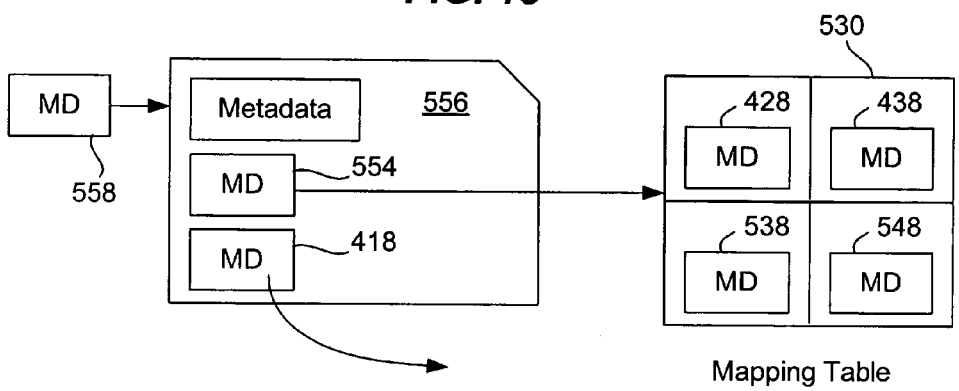
FIG. 20 illustrates a technique for allowing forward navigation.

FIG. 20 illustrates a technique for allowing this type of navigation. Similar to the techniques described in the flow chart of FIG. 16, a mapping table 530 is created that maps MD 428 (document B) into MD 438 (document B1). Using the techniques previously explained, message digests 538 and 548 are created that respectively reference documents C and C1 by way of descriptor files. These message digests are placed as an entry in the table such that MD 538 maps into MD 548.

Then descriptor file 566 is created that includes MD 554 and MD 418 (the message digest referencing document A). MD 558 is created and returned to the user as the message digest to be used in order to forward navigate to the new versions of documents B and C. Thus, when user provides MD 558 to the system, the user can navigate to document A via MD 418, and mapping table 530 will automatically map from documents B and C into their later versions thus allowing forward navigation.

Upon a reading of this disclosure, those of skill in the art will appreciate that much more complex mapping tables may be created that have any number of entries corresponding to the number of documents that have new versions created at a particular point in time. It is up to the user to define not only what he or she considers a new version to be, but also to define at what particular point in time a mapping table shall be created to map to these new versions. For example, considering the content space 570, if documents B1 and C1 are created sequentially and not at the same time, the user may wish to create a mapping table and message digest that only provides forward navigation to document B1. Or, the user may wish to wait until document C1 is created, and then create a mapping table and message digest for document A that does allow forward navigation to both documents B1 and C1. Or, the user may even choose not to create a mapping table for documents B1 and C1, thus effectively providing no forward navigation to documents B1 and C1 even though another person might consider them valid versions. It is certainly possible that this other person might indeed create a mapping table and message digest for document A that would allow forward navigation to documents B1 and C1. In this fashion, different users may define different content spaces for the same set of documents. What is considered a version, when mapping tables are created, and when forward navigation shall be enabled or not enabled, is entirely up to each individual user.

Figure 21:
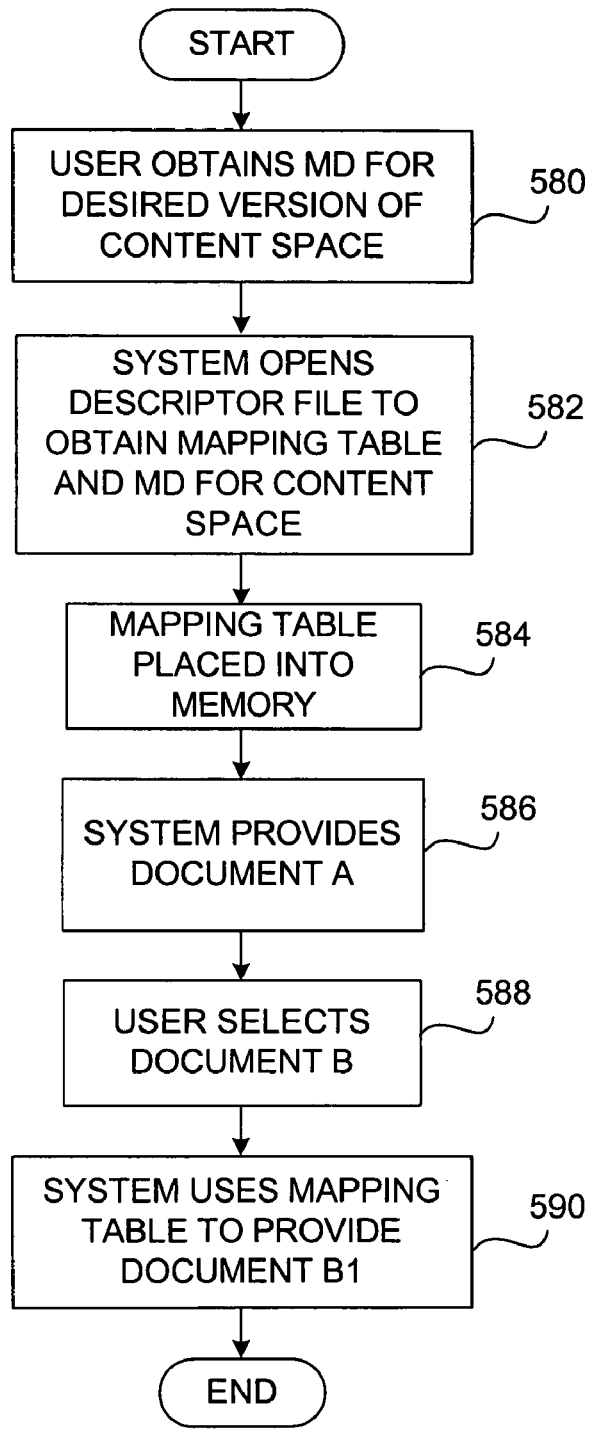
FIG. 21 is a flow chart describing forward navigation based on FIGS. 15 and 16.

FIG. 21 is a flow chart describing forward navigation based on FIGS. 15 and 16. In this situation, the user has created the new version document B1 and has enabled forward navigation and obtained MD 418' which identifies a content space in which document B1 is the latest version of document B.

In order to forward navigate through this content space, in step 580 the user first obtains MD 418' for this desired version of the content space. It should be appreciated that other message digests may be created using the techniques described herein that refer to different versions of the content space, e.g., where later versions of document B have been created, in which versions of documents B2 or C have been created, etc. Preferably, the meta data in the descriptor file that is uniquely identified by MD 418' contains a title or description that describes this version of the content space. Thus, the user can obtain the correct message digest for their intended purpose. In step 582, the system opens descriptor file 446 to obtain mapping table 440 and MD 418 which is the original message digest that references document A and the original content space. At step 584, the mapping table is placed into memory or into any other suitable location such as a database so that the system may reference the table when it performs forward navigation.

In step 586, the system provides document A to the user using MD 418 and MD 414. Next, in step 588, when the user selects document B from within document A, the system attempts to resolve MD 428. But, as mapping table 440 is in memory, in step 590 the system maps MD 428 into MD 438 and the user is provided with document B1 via file 436 and MD 434. In this fashion, the user is able to forward navigate to the latest version of document B within the desired content space. Of course, more complex forward navigation is possible depending upon the content space chosen by the user. In an alternative embodiment, the mapping table maps MD 424 into MD 434. Thus, reference to MD 428 in document A does produce file 426, but when the system reads MD 424 it will map it into MD 434 because of the mapping table. This alternative embodiment is an example of mapping at a lower level.

When forward navigation is performed using mapping tables, the contents of any mapping tables can be resolved at read time or at run time. In other words, when the user first provides a message digest that produces a mapping table, the system can immediately resolve that mapping, including looking up all message digests within a found descriptor file to resolve the mapping in any other mapping tables found. Alternatively, the system can wait until the user explicitly selects a link (that is, a message digest) before checking to see if a mapping exists for that link.

One added benefit of setting up a content space for forward navigation is that backward navigation is thus permitted through use of the mapping tables created, without needing the set up technique described earlier for backward navigation. Considering the example of FIGS. 14-17, once forward navigation has been enabled for content space 50, the user can backtrack using by reading the mapping tables backwards. Referring to FIG. 17, and the situation in which forward navigation has been enabled up through document B1-1, the system now has mapping tables 440 and 507 in memory. Should the user have MD 508 that identifies document B1-1 and wish to backtrack, the system refers to table 507 and determines that the next most recent version is found at MD 438, which is document B1. Next, by referring to table 440, the system determines that the next recent version MD 438 is MD 428, which identifies document B. In this fashion, backward navigation is enabled by the mapping tables used in forward navigation. Further, should the user wish to backtrack further to document A (which contains a message digest for document B), circular navigation may be used to return to document A.

Although mapping tables have been described in the context of being included within the descriptor file of a high level message digest, it is possible that mapping tables are kept separately and passed as a parameter when invoking a session. Consider FIG. 15. In this example, mapping table 440 is included within a new descriptor file 446 that has been created to hold the mapping table (or its message digest) and the original message digest that identifies document A. In this fashion, a user armed with MD 418' is guaranteed to use table 440 when he or she invokes MD 418' and can view the desired content space without knowing more or passing other parameters.

But, if it is not desirable to create a new descriptor file 446 to hold the reference to the mapping table, upon creation of the mapping table, the system can simply return MD 418 to the user (the original identifier for document A) along with MD 442 that uniquely identifies the mapping table. The system than apprises the user, or the user is aware, that in order to forward navigate to the content space in which document B1 is the latest version, that the user must invoke a session with the system and pass as parameters both MD 418 and MD 442. In one variation, a descriptor file can be created for MD 442 that includes a description of the content space as meta data. I.e., the meta data describes the content space as "marketing version 1.2", for example. Thus, upon invoking a session and passing MD 418 and the message digest for the descriptor file, the user can view a description of the desired content space. These embodiments allow for the user to retain original MD 418 as the identifier for document A, but also require that to view a particular content space, the user does need to pass a message digest for the mapping table as a parameter when invoking a session (or pass some reference to allow the mapping table to be found).

Circular Navigation

Figure 22:
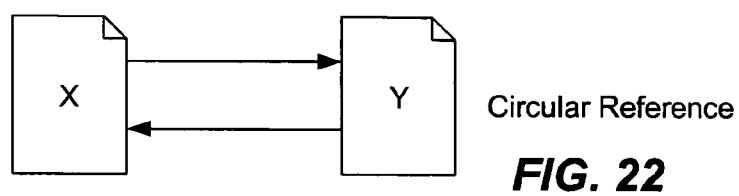
FIG. 22 illustrates a scenario in which the user desires that document X and Y each reference one another.

FIG. 22 illustrates a scenario in which the user desires that document X and Y each reference one another. Termed a "circular" reference, the user desires that a link within document X uniquely identify document Y, and that a link within document Y uniquely identify document X. While a hash value for document Y may be created and inserted into document X in order to provide a unique link to document Y, it would then not be possible to modify document Y to insert a unique reference to document X. If document Y were modified after its hash value had been created, then in essence, a new version of document Y has been created and the original hash value computed would not correspond to the new version of document Y. In order to address this situation, an embodiment of the present invention provides a suitable technique.

Figure 23:
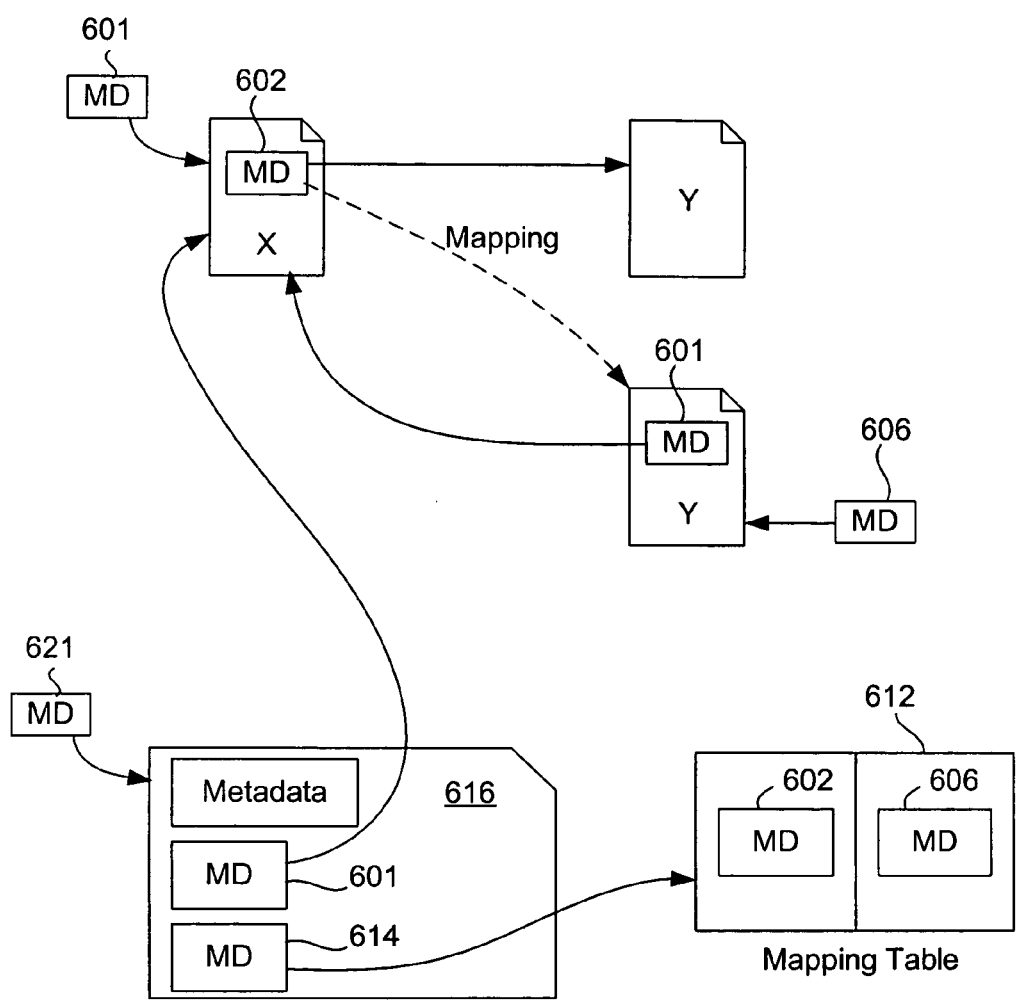
FIG. 23 illustrates a circular navigation technique that allows two documents to uniquely identify one another using hash values.

FIG. 23 illustrates a circular navigation technique that allows two documents to uniquely identify one another using hash values. At some point in time, a user obtains (or creates) a document Y and a document X which contains a reference that uniquely identifies document Y. In this situation, message digest 602 (preferably a message digest of a descriptor file) has been calculated for document Y and is inserted within document X to provide a reference to document Y. The user is also provided with (or the system calculates) a message digest 601 (preferably an MD of a descriptor file) that uniquely identifies document X. At this point in time, the user may use MD 601 to locate document X and thus find a unique reference to document Y. At this point in time, however, there is no reference within document Y to document X. The user might create a new version of document Y, namely, document Y' that does include MD 601 that does uniquely identify document X. But, a new version of document Y has thus been created because the insertion of MD 601 changes the original document Y. Given document Y' the user could navigate to document X and then to document Y, but then could not navigate back to document X. Alternatively, given document X, the user could navigate to document Y but then could not navigate back to document X.

Figure 24:
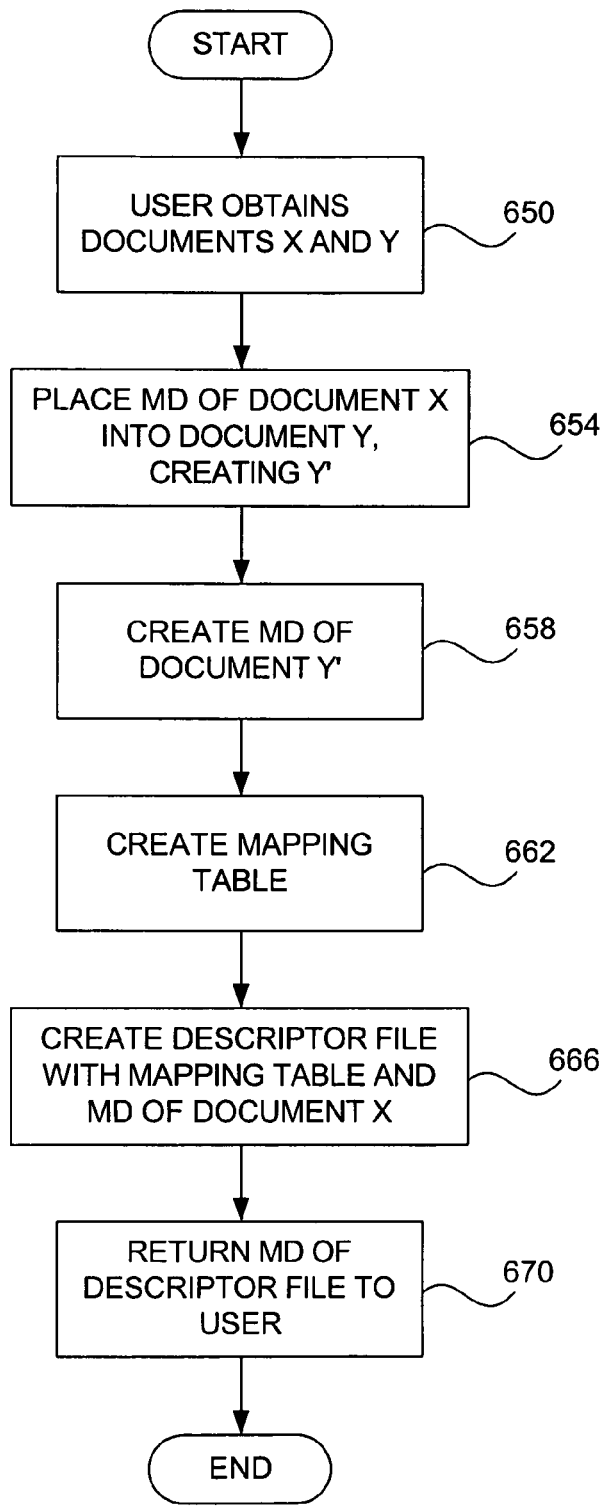
FIG. 24 is a flow chart describing a technique for enabling circular navigation between the two documents.

FIG. 24 is a flow chart describing a technique for enabling circular navigation between the two documents. Based upon the illustration of FIG. 23, the user first obtains in 650 documents X and Y as previously described. Document X contains a unique reference to document Y and MD 601 identifies document X. In order to create a circular reference, in step 654 the user (or the system) first creates a new version of document Y, document Y', and inserts the message digest of document X, MD 601, into document Y'. Of course, the user may modify document Y in any other way at the same time. In step 658, the system then creates MD 606 (preferably a message digest of a descriptor file) which uniquely identifies document Y'. In step 662, the system creates mapping table 610 which maps MD 602 (the message digest of original document Y) into MD 606 (the message digest of new document Y').

In step 666, descriptor file 616 is created that includes MD 614 that references mapping table 610, and MD 601 that uniquely identifies document X. A message digest 621 of the descriptor file is created and is returned to the user. MD 621 thus provides an entry point to the user for performing circular navigation between documents X and Y.

In order to navigate between documents X and Y, the user begins by receiving MD 621 which is titled or described as the message digest for the content space allowing circular navigation between the two documents. Upon receiving MD 621 the system then has access to mapping table 610 and document X. The user is then able to view document X. When the user accesses (or otherwise clicks or selects) MD 602 in order to view document Y, the system refers to the mapping table which maps MD 602 into MD 606. Thus, when the user attempts to view document Y, the system instead provides a mapping to document Y' using MD 606. Once within document Y', the user has available MD 601 which provides a unique reference back to document X in a circular fashion. In this way, circular navigation is permitted between two documents. Circular navigation can also be used to create a self-referencing document. For example, a PowerPoint presentation can contain an explicit reference to itself; the message digest (or preferably an easy human-readable form) may be printed out on the handout pages.

Figure 25:
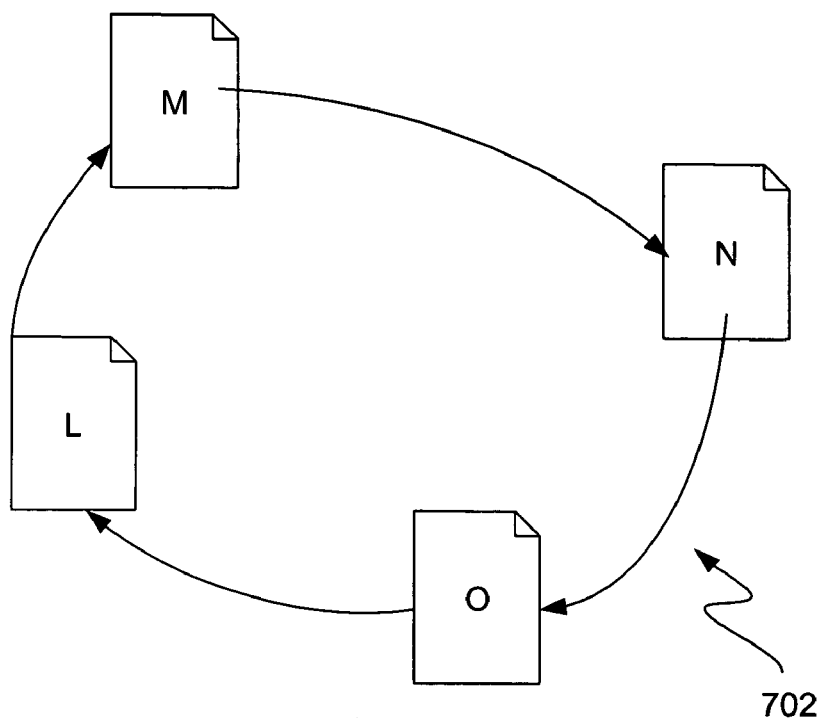
FIG. 25 illustrates a scenario in which circular navigation is performed around any number of documents.

Upon a reading of this disclosure, it will be apparent to one of skill in the art that more complex circular navigation may take place. For example, circular navigation may occur not simply between two documents but in a circular fashion around any number of documents. FIG. 25 illustrates a scenario in which circular navigation is performed around any number of documents. In this situation, a user wishes to create a content space 702 in which circular navigation is permitted as shown, from document M to N, from N to O, from O to L, and from L back to M.

Figure 26:
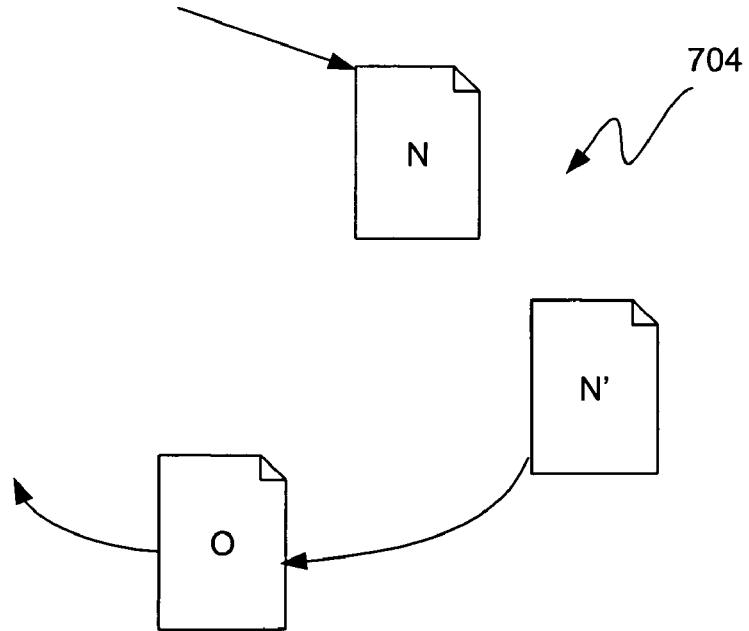
FIG. 26 illustrates a technique to set up circular navigation around multiple documents.

FIG. 26 illustrates a technique to set up circular navigation around multiple documents. To set up this type of circular navigation, a message digest is created for document N and inserted into document M (preferably the message digest is for a descriptor file that references document N). Next, a message digest (preferably a digest of a descriptor file) is computed for document M (which now contains a unique reference to document N), and this message digest for document M is inserted into document L. In a similar fashion, a unique reference to document L is inserted into document O. Once a message digest is computed for document O, it cannot be inserted directly into document N because a message digest for document N has already be created. Using the circular navigation technique and a mapping table described above, though, the desired mapping from document N to document O can be performed by providing a mapping table that maps a message digest for document N into a message digest for document N'. The message digest (preferably a digest of a descriptor file) for document O is inserted into document N'. Content space 704 is thus created where document N' is the same as document N except that it contains the digest for document O. A mapping table is created that maps the digest for N into the digest for N'. Finally, a descriptor file is created that includes the mapping table and the digest for one of these documents. A digest is computed for the descriptor file and returned to the user as the entry point for performing circular navigation around these documents.

Computer System Embodiment

The present invention may be implemented on a wide variety of computers. In one contemplated embodiment, the computer hardware used to store and retrieve documents is a Centera brand computer available from EMC Corporation of Hopkinton, Mass. The Centera product description guide describes this computer and its software, and is available at http://www.emc.com/pdf/products/centera/centera_guide.pdf, and is hereby incorporated by reference. The system software may be written using Linux and JAVA. In this embodiment, it is contemplated that the Centera computers are the back end of a web site that allows a user to supply message digests via a URL, such as shown in FIG. 2. System software operating on a web site server interface between the Centera and a user, and allow forward, backward and circular navigation as herein described. In other embodiments, the document storage, system software and user interface are all resident on a single computer. In yet other embodiments, a service provider provides the front end user interface over the Internet that interfaces with a user, but then searches for documents identified by message digests over the Internet or other worldwide network, rather than storing the documents itself. Or, a totally distributed peer-to-peer system is based solely on content-addressable storage to retrieve and guarantee its content.

Figure 27A:
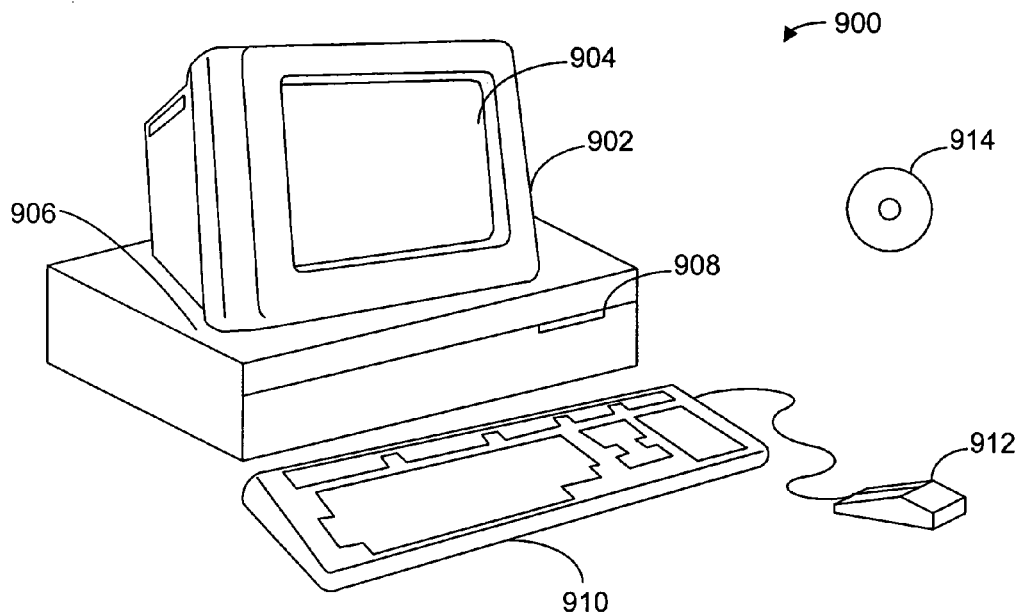
FIGS. 27A and 27B illustrate a computer system suitable for implementing embodiments of the present invention.
Figure 27B:
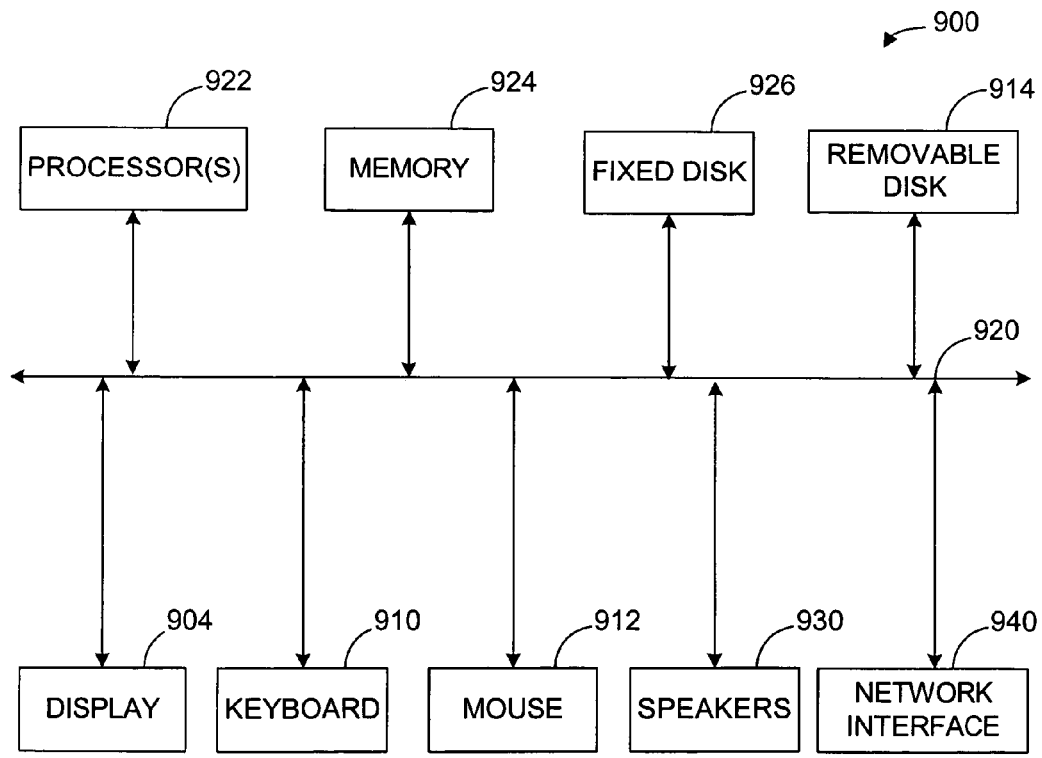

FIGS. 27A and 27B illustrate a computer system 900 suitable for implementing embodiments of the present invention. FIG. 27A shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 27B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of enabling forward navigation in a content space, said method comprising:

receiving a first message digest that identifies a first computer file;

receiving a second message digest that identifies a second computer file;

receiving an indication that said second computer file is a later version or said first computer file;

creating a mapping table that maps said first message digest into said second message digest;

creating a descriptor file that includes said first message digest and an identification of said mapping table; and creating a third message digest of said descriptor file and returning said third message digest to a user, whereby said user uses said third message digest to navigate forward through said content space formed by said first and second computer files.

2. A method as recited in claim 1 wherein said first message digest is the digest of a first descriptor file that identifies said first computer file, wherein said second message digest is the digest of a second descriptor file that identifies said second computer file.

3. A method as recited in claim 2 wherein said first and second descriptor files include meta data concerning said first and second computer files, respectively.

4. A method as recited in claim 1 wherein said second computer file is received by said user or is created by said user.

5. A method as recited in claim 1 wherein said descriptor file includes meta data.

6. A method as recited in claim 1 wherein said descriptor file includes said mapping table.

7. A method as recited in claim 1 wherein said descriptor file includes a message digest that identifies said mapping table.

* * * * *